US006341353B1

(12) United States Patent
Herman et al.

(10) Patent No.: US 6,341,353 B1
(45) Date of Patent: Jan. 22, 2002

(54) SMART ELECTRONIC RECEIPT SYSTEM

(75) Inventors: Gary Herman, San Francisco; Theodore Charles Goldstein, Palo Alto; Ronald G. Martinez, San Francisco, all of CA (US)

(73) Assignee: The Brodia Group, San Francisco, CA (US)

( * ) Notice: Subject to any disclaimer, the term of this patent is extended or adjusted under 35 U.S.C. 154(b) by 0 days.

(21) Appl. No.: 09/467,545

(22) Filed: Dec. 10, 1999

Related U.S. Application Data

(63) Continuation-in-part of application No. 08/834,027, filed on Apr. 11, 1997.
(60) Provisional application No. 60/111,988, filed on Dec. 12, 1998.

(51) Int. Cl.[7] .............................................. G06F 12/14
(52) U.S. Cl. ......................................... 713/201; 705/39
(58) Field of Search .............................. 705/26, 27, 39, 705/41, 35; 713/200–202; 380/233; 235/375

(56) References Cited

U.S. PATENT DOCUMENTS

| 5,710,887 A | * | 1/1998 | Chelliah et al. ............... 705/26 |
| 5,745,886 A | * | 4/1998 | Rosen ........................... 705/39 |
| 5,903,880 A | * | 5/1999 | Biffar .......................... 705/39 |
| 5,960,411 A | | 9/1999 | Hartman et al. ............... 705/26 |

FOREIGN PATENT DOCUMENTS

| WO | WO 99/24891 | 5/1999 |
| WO | WO 99/24892 | 5/1999 |

* cited by examiner

*Primary Examiner*—James P. Trammell
*Assistant Examiner*—Pierre Eddy Elisca
(74) *Attorney, Agent, or Firm*—Michael A. Glenn

(57) ABSTRACT

A smart electronic receipt system that provides intelligent receipts, called Smart Receipts, that electronically document a transaction between two parties and maintains a persistent connection between the two parties following a successful online transaction. A Trusted Agent on the Buyer's client system creates an order record which is stored in a database on a Trusted Agent Server and starts the transaction process with the merchant. A Smart Receipt is delivered by a Smart Receipt Agent over a secure connection from the merchant to the Trusted Agent Server upon successful completion of a purchase and reflects the details of the transaction. It is stored in a secure database on the Trusted Agent Server and is made available to the Buyer (user) through a Trusted Agent located on his machine. The Trusted Agent Server compares the order record Limited Edition Digital Objects (LEDOs) stored in database with the Smart Receipt's LEDO to find the corresponding order record. The Smart Receipt provides the customer with detailed information about an online purchase in a standardized format. Hyperlinks embedded in the Smart Receipt enable the customer to access customer service and order status. The merchant may also embed addition-al services within the Smart Receipt, including special offers for future purchases. Offers provided in a Smart Receipt can be personalized to a user's preferences which are stored on the Trusted Agent Server. Each Smart Receipt is comprised of a chain of LEDOs with each LEDO object having a unique owner. A Smart Receipt is a dynamic entity and is continuously updated until the Buyer deletes it from the Trusted Agent Server.

28 Claims, 20 Drawing Sheets

| User's Browser | Trusted Agent | Merchant & Trusted Agent Server |
|---|---|---|
| 1. User browses the web to a merchant web site | | |
| | | 2. Merchant conducts a session with the user |
| | | 3. Merchant downloads a page to end user |
| 4. User invokes the Trusted Agent service using URL | | |
| | | 5. Trusted Agent Server downloads the Trusted Agent Program |
| | 6. Trusted Agent program inspects the Merchant's web page in the consumer's browser | |
| 7. User types in their Trusted Agent name and password | | |
| 8. User submits the web page to Trusted Agent server | 9. Along with the name and password, the merchant web page is uploaded to the Trusted Agent server | |
| | | 10. Trusted Agent Server analyzes the page |
| | | 11. A new Trusted Agent Program is generated by Trusted Agent Server |
| | 12. The generated trusted agent program received by the client instruments the merchant web page | |
| 13. User sees a set of operations such as credit card selection or address book selection in their Trusted Agent | | |
| 14. User selects the operation from the Trusted Agent page | 15. Trusted Agent fills out web page | |
| 16. User submits the merchant web page | | 17. Merchant process merchant web page as usual |

FIG. 16

SMART ELECTRONIC RECEIPT SYSTEM

This application claims priority from Provisional Patent Application No. 60/111,988, filed on Dec. 12, 1998 and is also continuation-in-part of application Ser. No. 08/834,027, filed on Apr. 11, 1997.

BACKGROUND OF THE INVENTION

1. Technical Field

The invention relates to electronic commerce in a computer environment. More particularly, the invention relates to the creation of intelligent receipts for electronic commerce and impartial intermediation for electronic negotiations in a computer environment.

2. Description of the Prior Art

Electronic commerce systems have grown dramatically in popularity in a very short time. More and more- consumers are switching from shopping in the local shopping malls to shopping online across the Internet.

The current models for electronic commerce deal mostly with secure transactions at the purchase stage. Digital certificates and Secure Socket Layers (SSL) are used to ensure that the buyer's transaction is secure from outside eyes.

However, the receipt stage of the transaction where the buyer receives confirmation of a purchase is still rather primitive. The current approaches to issuing a receipt for a transaction are simply to send an email to the buyer describing the transaction details or force the buyer to print out a transaction summary web page. These approaches do not take advantage of the power of the Internet and the buyer's computer system.

Issuing a dynamic receipt to a buyer gives merchants and manufacturers an opportunity to supply the buyer with more information about their products and services, both present and future. Further, it gives the buyer a chance to give merchants and manufacturers valuable feedback.

It would be advantageous to provide a smart electronic receipt system that creates dynamic, smart receipts that allow merchants and manufacturers to present value added services to the buyer. It would further be advantageous to provide a smart electronic receipt system that allows merchants and manufacturers to constantly update the smart receipt to keep the buyer up to date with current changes and information.

SUMMARY OF THE INVENTION

The invention provides a smart electronic receipt system. The system creates smart receipts that allow merchants and manufacturers to include value added services to the smart receipts. In addition, the invention provides a system that allows the smart receipts to be dynamically updated with new information from merchants and manufacturers.

A preferred embodiment of the invention provides intelligent receipts, called Smart Receipts, that electronically document a transaction between two parties. Smart Receipts maintain a persistent connection between two parties following a successful online transaction. A Trusted Agent on the Buyer's client system creates an order record which is stored in a database on a Trusted Agent Server. The order record starts the transaction process with the merchant.

A Smart Receipt is delivered by a Smart Receipt Agent over a secure connection from the merchant to the Trusted Agent Server upon successful completion of a purchase. The Smart Receipt reflects the details of the transaction. It is stored in a secure database on the Trusted Agent Server and is made available to the Buyer (user). The user can sort and browse his Smart Receipts through a Trusted Agent located on his machine.

The Trusted Agent Server compares the order record Limited Edition Digital Objects (LEDOs) stored in database with the Smart Receipt's LEDO to find the corresponding order record. A transaction cannot be completed without a matching order and Smart Receipt record pair.

The Smart Receipt provides the customer with detailed information about an online purchase in a standardized format. Hyperlinks embedded in the Smart Receipt enable the customer to access customer service and order status. The merchant may also embed additional services within the Smart Receipt, including special offers for future purchases. Offers provided in a Smart Receipt can be personalized to a user's preferences which are stored on the Trusted Agent Server.

Each Smart Receipt is comprised of a chain of LEDOs with each LEDO object having a unique owner. Smart Receipts are dynamic entities and are continuously updated until the Buyer deletes it from the Trusted Agent Server.

The dynamic nature of Smart Receipts allow a merchant or manufacturer to update a Smart Receipt at any time to notify a customer of new events. A merchant can specify that a return receipt be sent to the merchant when the user receives the associated Smart Receipt. Merchants can also provide post-purchase services to a customer by embedding additional information within a Smart Receipt.

A further embodiment of the invention provides a Trusted Agent Server to act as an. impartial trusted intermediary between parties involved in a negotiation. each step of the negotiation process is recorded as a LEDO in a Smart Receipt. The Smart Receipt is stored on a secure database on the Trusted Agent Server in the same manner as normal Smart Receipts. A Trusted Agent on each party's client system submits a party's offer, counter-offer, or acceptance LEDO to the Trusted Agent Server. Each party can browse the Smart Receipt through their Trusted Agent.

Other aspects and advantages of the invention will become apparent from the following detailed description in combination with the accompanying drawings, illustrating, by way of example, the principles of the invention.

BRIEF DESCRIPTION OF THE DRAWINGS

FIG. 16 is a flow diagram that depicts the use of the trusted agent by a customer during a commercial transaction with a merchant according to the invention;

DETAILED DESCRIPTION OF THE INVENTION

The invention is embodied in a smart electronic receipt system in a computer environment. A system according to the invention creates smart receipts that are capable of presenting dynamic information to a buyer after the completion of a transaction. In addition, the invention provides a system that allows merchants and manufacturers to make value added services readily accessible to customers through the smart receipts.

Overview of a Virtual Property System

Figure 1:
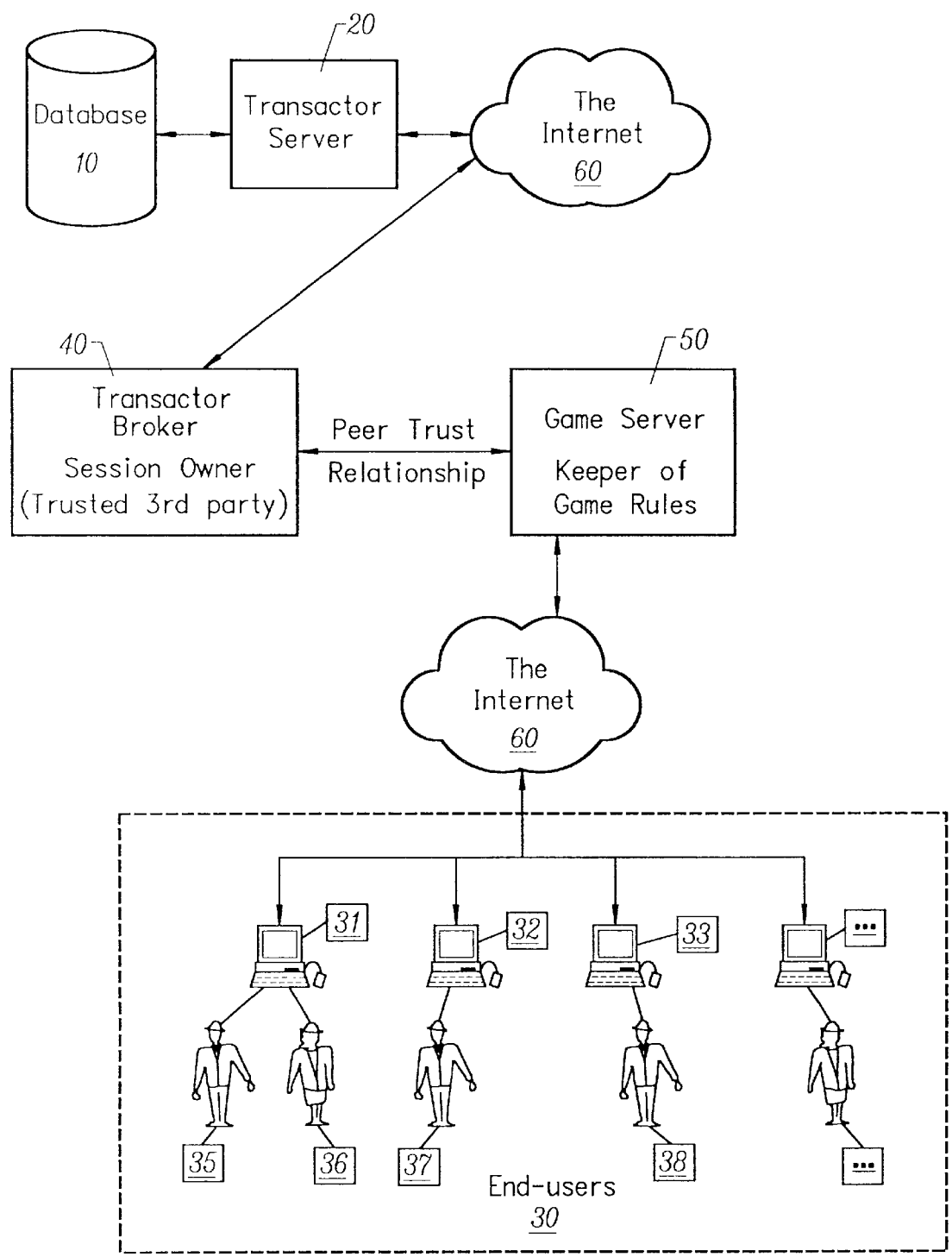
FIG. 1 is an overview of an embodiment of a virtual property system according to the invention.
Figure 2:
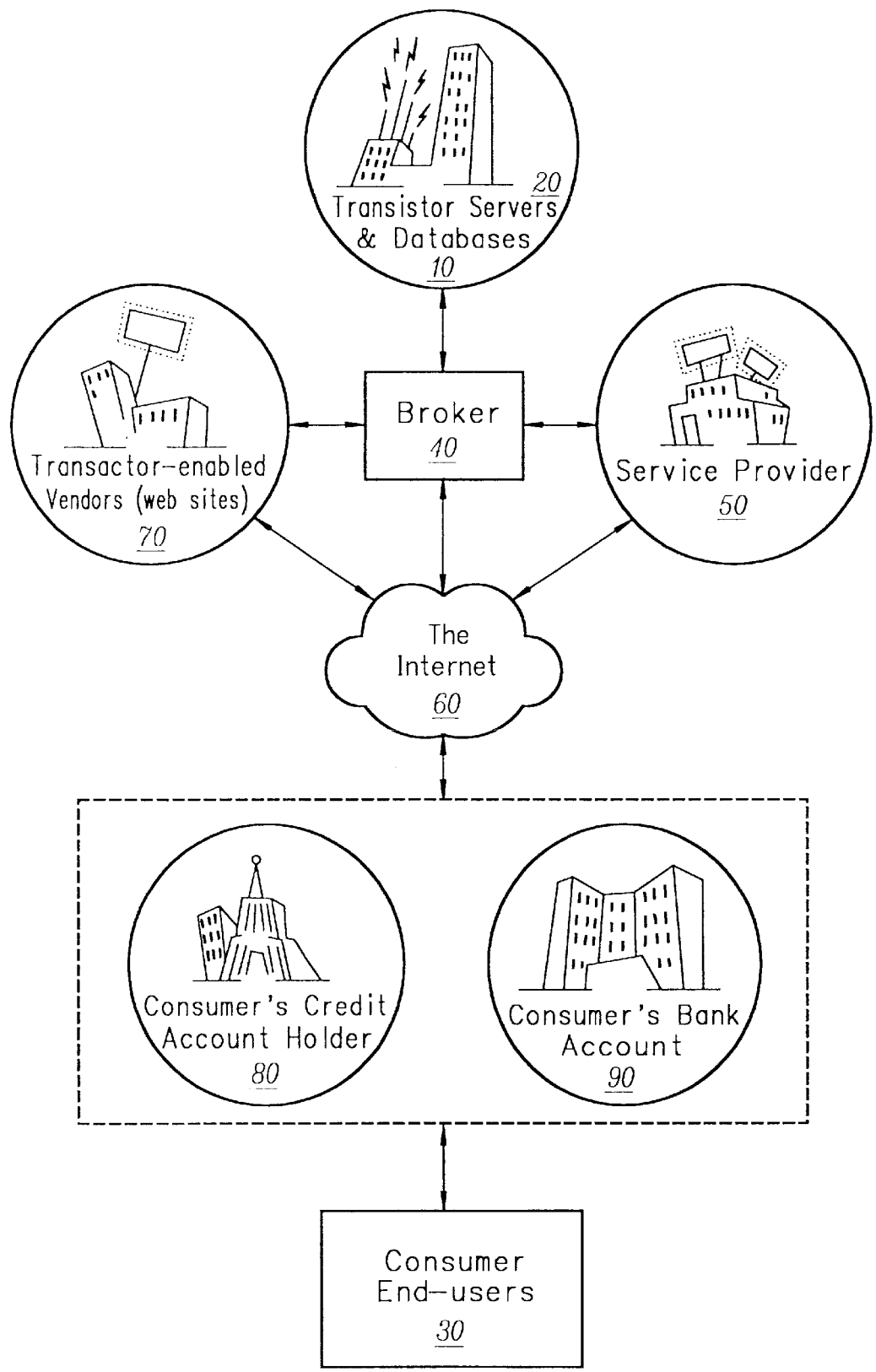
FIG. 2 illustrates the basic relationships among elements of an embodiment of a virtual property system according to the invention.

A preferred embodiment of a property ownership and transfer system according to the present invention is illustrated in FIG. 1 and FIG. 2 and referred to herein as a "Transactor" system. The illustrated Transactor system involves a database 10, a Transactor server 20, end-users 30, a Transactor broker 40, and an application service provider (e.g., a game server) 50. End users 30 comprise end-user computers (or "terminals") 31, 32, and 33, and end-user individuals 35, 36, 37, and 38.

The illustrated Transactor system may include any number of end-users and/or end-user terminals; an additional-terminal and an additional user labeled " . . . " are included in FIG. 1 to illustrate this fact. Database 10 and Transactor server 20 may each comprise a plurality of databases and servers, respectively. Embodiments of the system optionally may include any number of Transactor brokers and application service providers with any number of associated end users.

The application service provider may be a general Internet service provider (e.g., AOL, CompuServe, Pacific Bell), a game specific service provider (e.g., Mpath, Heat, TEN), an open network market-specific service, a closed or private network service, or any other service provided over a computer network. For illustrative purposes only, the below discussion emphasizes the example of a Transactor system in which the application service provider comprises a game server, and the end-users comprise game clients.

End users 30 interact with one another and with game server 50 over a computer network (e.g., the Internet) 60 in a virtual world (e.g., an interactive environment governed by a prescribed set of rules) provided by game server 50 and supported by Transactor server 20. In this virtual world, digital property can be owned by, used, and transferred among end users. End users can also transfer digital property while offline (i.e., not in communication with the game or Transactor servers). Transactor server 20 communicates with Transactor broker 40 over the Internet 60 or, optionally, by a direct communications link.

As illustrated in FIG. 2, other optional participants in the illustrated Transactor system include Transactor-enabled vendors (e.g., web sites) 70, a consumer's credit account holder 80, and a consumer's bank account 90. Transactor-enabled vendors preferably are accessible via the Internet 60, as are consumer's credit account holder 80 and consumer's bank account 90. The illustrated Transactor entities can be categorized broadly as clients and/or servers. Some entities may act as both a client and a server at the same time, but always as one or the other with regard to other specific entities. For example, a game server acts as a client to a Transactor server, but as a server to its game clients.

The main categories of computing entities in the overall Transactor hierarchy are:

(1) Transactor servers;
(2) Transactor clients;
(3) game servers; and
(4) game clients (who are implicitly also Transactor clients).

It should be noted that these computing entities do not necessarily map directly onto individuals, companies, or organizations. An individual, for example, may have more than one Transactor account. Similarly, a game company may set up game servers with more than one Transactor account.

1. Transactor Servers

As described further below, Transactor servers provide transaction and ownership authentication to their clients, who may be other Transactor servers, game servers, game users (which are game clients acting through a game server) and Transactor users (which are not acting through any game server). Transactor servers operate on Transactor user accounts and encapsulated Transactor objects; they need not know the details of any particular game world that may exist.

The Transactor servers essentially define a marketplace in which safe transactions may occur, and existence and ownership may be asserted and verified under rules (i e., "Transactor Laws ofNature") defined for the Transactor system as a whole. The primary purpose of the Transactor system is to provide a safe marketplace for objects and owners outside the scope of any game in which those objects and owners might participate. If a potential game does not require its game objects to exist outside the scope of its game universe, then using Transactor to determine authenticity and ownership is not necessary. It may, however, be more convenient or easier to use Transactor services than to create a special-purpose property ownership and transfer system for that game.

A given Transactor server is responsible for the objects and users defined in its own database. A Transactor server trusts other Transactor servers for validation of all other objects and users. It can, however, detect certain kinds of cheating that might occur in its conversations with those other Transactor servers.

In some embodiments, a group of Transactor servers have secure access to a shared distributed database. In such embodiments, the group of servers appears, for most-purposes, as a single large Transactor server acting on a single database.

2. Transactor Users

Transactor users are users that are in direct communication with a Transactor server rather than in communication through an intermediary game server. Thus, they are limited to the core Transactor activities of creating objects, making transactions, and authenticating ownership and existence. All other activities are performed through a game server.

3. Game Servers

To a Transactor server, a game server is a Transactor user that performs transactions and limited types of authentications (e.g., verify game membership). Among themselves, however, game servers define, in a conventional manner, a game "universe" or "virtual world" for their clients, and operate on a set of game objects using game rules that the game designer defines for that game. A game universe includes all servers that run the game, the game software's behavior, and the rules that define possible behavior for that game.

4. Game users

Game users are the participants in a game universe that exists on one or more game servers. Preferably, most Transactor operations on the game's owned objects are brokered by the game server, acting on behalf of the game user. In such embodiments, the only time a game user appears as a Transactor user is when object ownership must be authenticated or changed. Even then, however, this activity may be brokered by the game server acting within the scope of the game universe's possible actions.

The components of the illustrated Transactor system, along with their implementation and use, are described in more detail herein. Prior to such description, however, basic operations and transactions in an embodiment of a Transactor system are described.

Scenario Examples

This section describes various uses of a Transactor system in the form of exemplary "scenarios," which are illustrated in FIGS. 3, 4, 5, 6, and 7. A scenario is an exemplary use of Transactor technology to accomplish some purpose for a user. A user may be a consumer, a vendor, or any other user of the Transactor technology, including an intermediate server program that subscribes to Internet-based Transactor services; for convenience, the user is referred to consistently in these scenarios as a consumer.

The illustrated scenarios are representative examples only. Other scenarios and their implementation will be apparent to those of ordinary skill in the art based on the present disclosure. The scenarios refer to the elements of the Transactor system illustrated in FIGS. 1 and 2, along with certain details and components described further herein.

Figure 3:
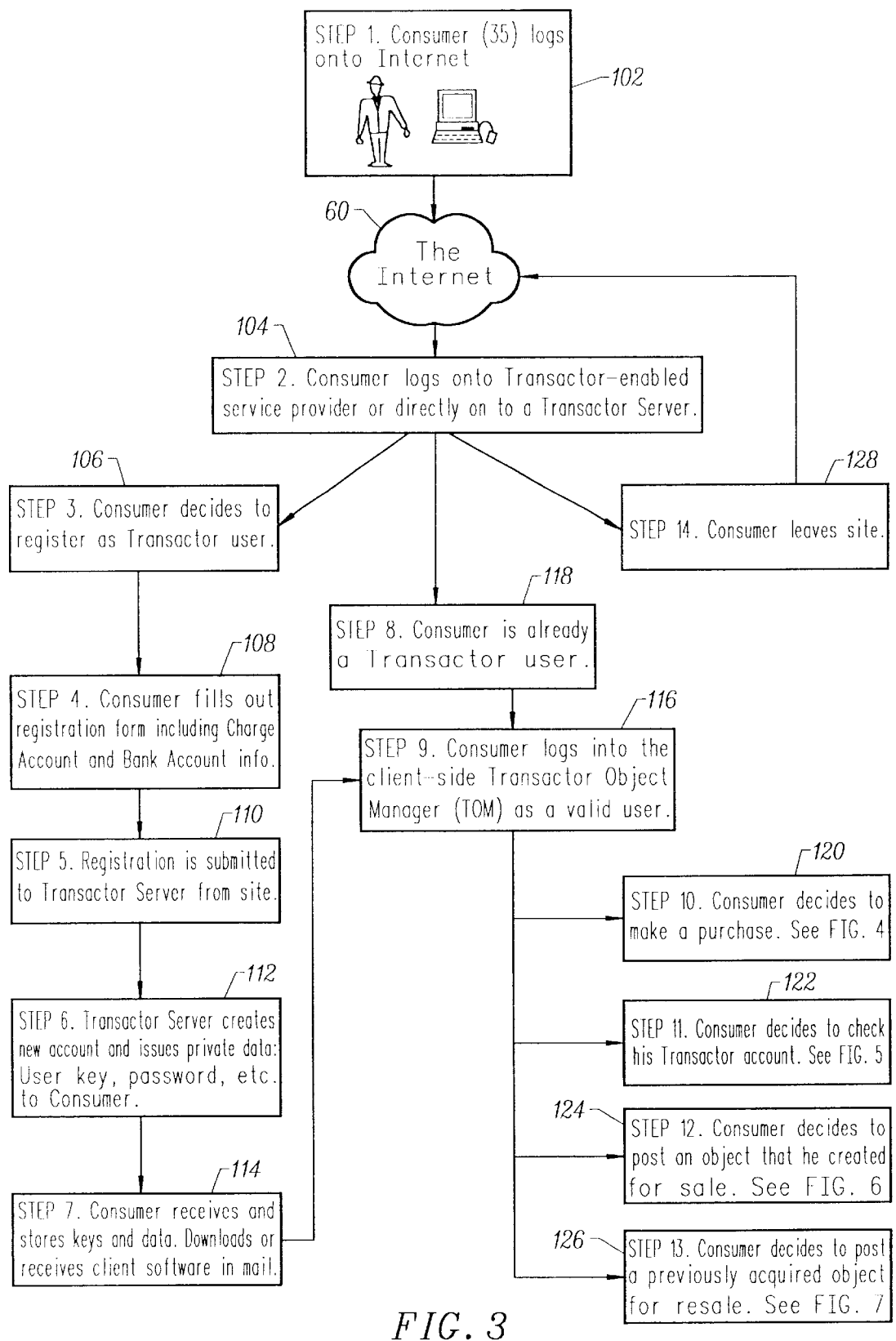
FIG. 3 illustrates a consumer login scenario used in connection with an embodiment of a virtual property system according to the invention.

The Login Scenario (FIG. 3)

FIG. 3 describes a process in which a user logs on, and optionally registers as a Transactor user, in an exemplary embodiment of a Transactor system. As illustrated in FIG. 3, the following steps take place:

In step 1 (illustrated at 102), the consumer (e.g., user 35) logs onto the Internet 60.

In step 2 (at 104), the consumer logs onto a Transactor enabled service provider (or onto a Transactor server).

At this point, there are several possibilities. The consumer may decide to register as a Transactor user (step 3, at 106). Alternatively, the consumer may decide not to register as a Transactor user and, consequently, leave the site (step 14, at 128). Alternatively, the consumer may already be a registered Transactor user (step 8, at 118) and have no need to register as a Transactor user.

Assuming the consumer decides to register as a Transactor user, the consumer fills out a registration form (step 4, at 108), identifying his or her charge account and bank account information. When the consumer has entered the requested information, the information is submitted to a Transactor server (step 5, at 110). The Transactor server creates anew account and issues private data (e.g., user key, password) to the consumer (step 6, at 112). The consumer receives and stores the keys and other data, and obtains the Transactor client software (e.g., by download or mail) (step 7, at 114).

After the consumer has become a registered Transactor user (after completing step 7 or step 8), the consumer logs into the client-side Transactor object manager (which is described further herein and abbreviated "TOM") as a valid user (step 9, at 116).

After logging in as a valid user, the consumer has a variety of options. The consumer may decide (Step 10) to make a purchase (illustrated at 120 and in FIG. 4). The consumer may decide (step 11) to check his Transactor account (illustrated at 122 and in FIG. 5). The consumer may decide (step 12) to post an object that he has created for sale (illustrated at 124 and in FIG. 6). The consumer may decide (step 13) to post a previously acquired object for resale (illustrated at 126 and in FIG. 7).

Figure 4:
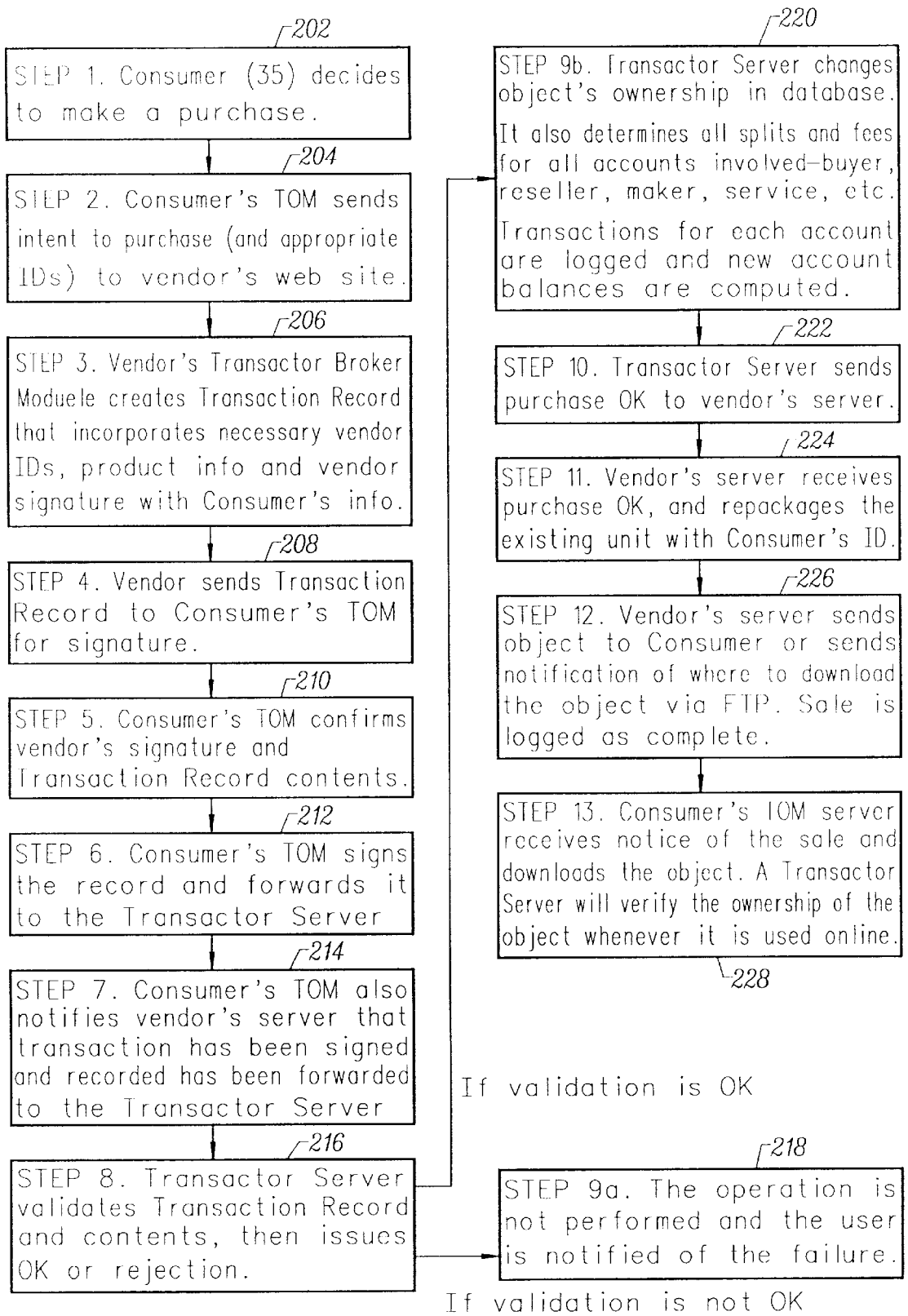
FIG. 4 illustrates a web purchase scenario used in connection with an embodiment of a virtual property system according to the invention.

The Consumer Web-Purchase Scenario (FIG. 4)

FIG. 4 describes the process in which a user makes a simple purchase from a web sales site and uses the new object on the network in an exemplary embodiment of a Transactor system. As illustrated in FIG. 4, the following steps take place:

In step 1 (at 202), a consumer (e.g., user 35) decides to make a purchase. The consumer's TOM sends (step 2, at 204) signals indicating an intent to purchase, along with the appropriate user ID and product information, to the vendor's web site. The vendors Transactor broker module creates (step 3, at 206) a transaction record that incorporates necessary vendor IDs, product information and vendor signatures with consumer's information.

The vendor then sends (step 4, at 208) a transaction record, as described further herein, to the Consumer's TOM for signature. The consumer's TOM confirms (step 5, at 210)the vendor's signature and transaction record contents, and signs and forwards (step 6, at 212) the transaction record to the Transactor server. The consumer's TOM also notifies (step 7, at 214) the vendor's server that the transaction has been signed and a record has been forwarded to the Transactor server.

The Transactor server then validates (step 8, at 216) the Transaction record and contents, issuing an OK (i.e., transaction is valid) or a rejection (transaction is invalid). If the validation is not OK, the operation is not performed and the user is so notified (step 9a, at 218). If the validation is OK, the Transactor changes (step 9b, at 220) the object's ownership in the relevant database and determines all splits and fees for all accounts involved (e.g., buyer, reseller, maker, service provider); transactions for each account are then logged and new account balances are computed.

The Transactor server then sends (step 10, at 222) a purchase OK to the vendor's server, and the vendor's server receives (step 11, at 224) the OK and repackages the existing unit with the consumer's ID.

The vendor's server then sends (step 12, at 226) the object to the consumer or sends notification of where to download the object via FTP. The sale is logged as complete.

Finally, the consumer's TOM server receives (step 13, at 228) notice of the sale and downloads the object according to the instructions received in step 12. When the object is subsequently used online, a Transactor server will verify the ownership of the object.

Figure 5:
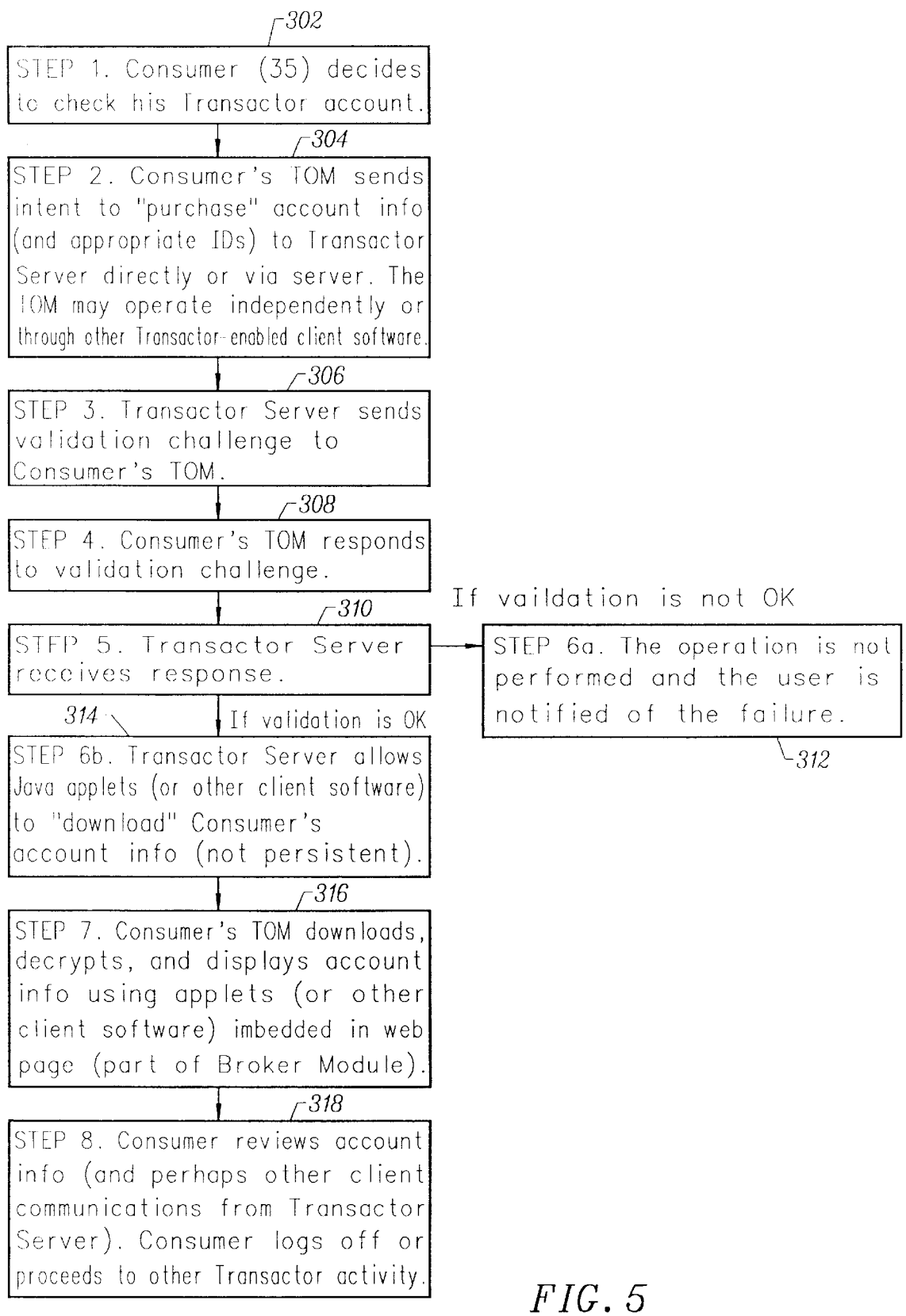
FIG. 5 illustrates an account checking procedure used in connection with an embodiment of a virtual property system according to the invention.

The Consumer Account-Check Scenario (FIG. 5)

FIG. 5 describes the process in which a consumer checks his Transactor account. As illustrated in FIG. 5, the following steps take place:

In step 1 (at 302), a consumer (e.g., user 35) decides to check his Transactor account.

The consumer's TOM sends (step 2, at 304) intent-to-purchase account information (with appropriate user IDs) to the Transactor Server, either directly or via a Transactor enabled web site or broker server. The TOM may operate independently or through other Transactor enabled client software. The Transactor server then sends (step 3, at 306) a validation challenge to the consumer's TOM, and the consumer's TOM responds (step 4, at 308) to the validation challenge. The Transactor server receives the response (step 5, at 310).

If the validation is not OK, the operation is not performed and the user is notified of the failure (step 6a, at 312).

If the validation is OK, the Transactor server allows (step 6b, at 314Phe client software (e.g. Java applets) to download the consumer's account information (not persistent). The consumer's TOM downloads (step 7, at 316), decrypts and displays account information using applets (or other client software) embedded in the web page (part of broker module, described herein).

The consumer then reviews (step 8, at 318) account information (along with other communications from the Transactor server, if any have been received) and logs off or proceeds to other Transactor activity.

Figure 6:
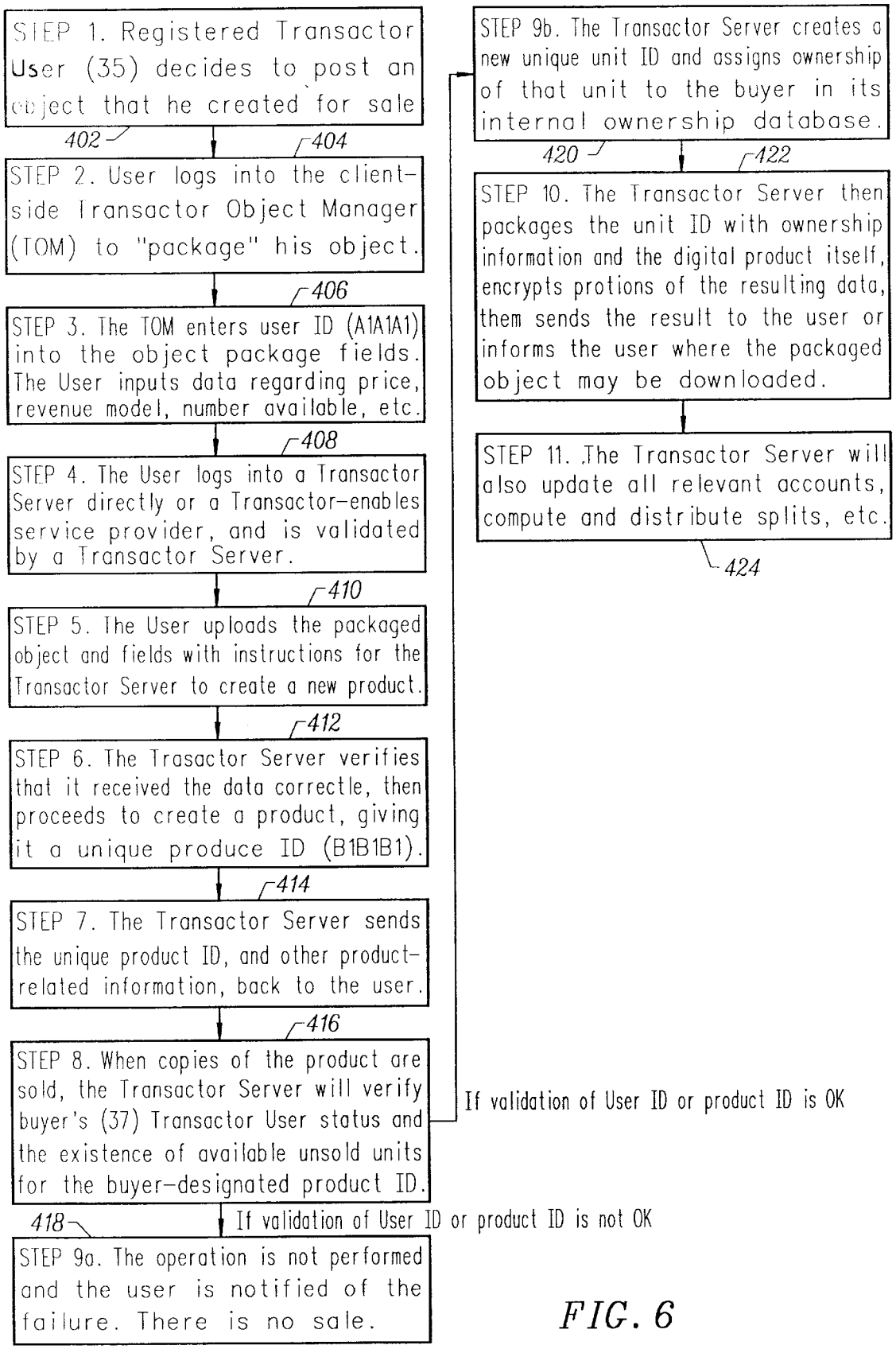
FIG. 6 illustrates a procedure for posting a newly created object for sale in connection with an embodiment of a virtual property system according to the invention.

The Sale of Created Object Scenario (FIG. 6)

FIG. 6 describes the process in which a registered Transactor user posts an object that he created for sale. As illustrated in FIG. 6, the following steps take place:

In step 1 (at 402), a registered Transactor user (e.g., user 35) decides to post an object that he has created for sale. The user the (step 2, at 404) logs into the TOM to "package" his object, the TOM enters (step 3, at 406) the user ID (e.g., A1A1A1) into the object package fields, and the user inputs data regarding, for example, price, revenue model, and number available.

The user logs on (step 4, at 408) to a Transactor Server directly or a Transactor-enabled service provider, and is validated by a Transactor Server. The user then uploads (step 5, at 410) the packaged object and fields with instructions for the Transactor Server to create a new product.

The Transactor Server then verifies (step 6, at 412) that it received the data correctly, and proceeds to create a product, giving it a unique product ID (B1B1B1). The Transactor Server then sends (step 7, at 414) the unique product ID, and other product-related information, back to the user.

When copies of the product are sold, the Transactor Server will verify (step 8, at 416) buyer's (37) Transactor User status and the existence of available unsold units for the buyer-designated product ID.

If the validation of user ID or product ID is not OK, the operation is not performed and the user is so notified (step 9, at 418).

If the user ID and product ID are OK (step 9b, at 420) to produce a new unit of the product, the Transactor Server creates a new unique unit ID and assigns ownership of that unit to the buyer in its internal ownership databases. The Transactor Server then packages (step 10, at 422) the unit ID with ownership information and the digital product itself, encrypts portions of the resulting data, and sends the result to the user or informs the user where the packaged object may be downloaded. The Transactor Server also updates (step 11, at 424) all relevant accounts, computes and distributes splits.

Figure 7:
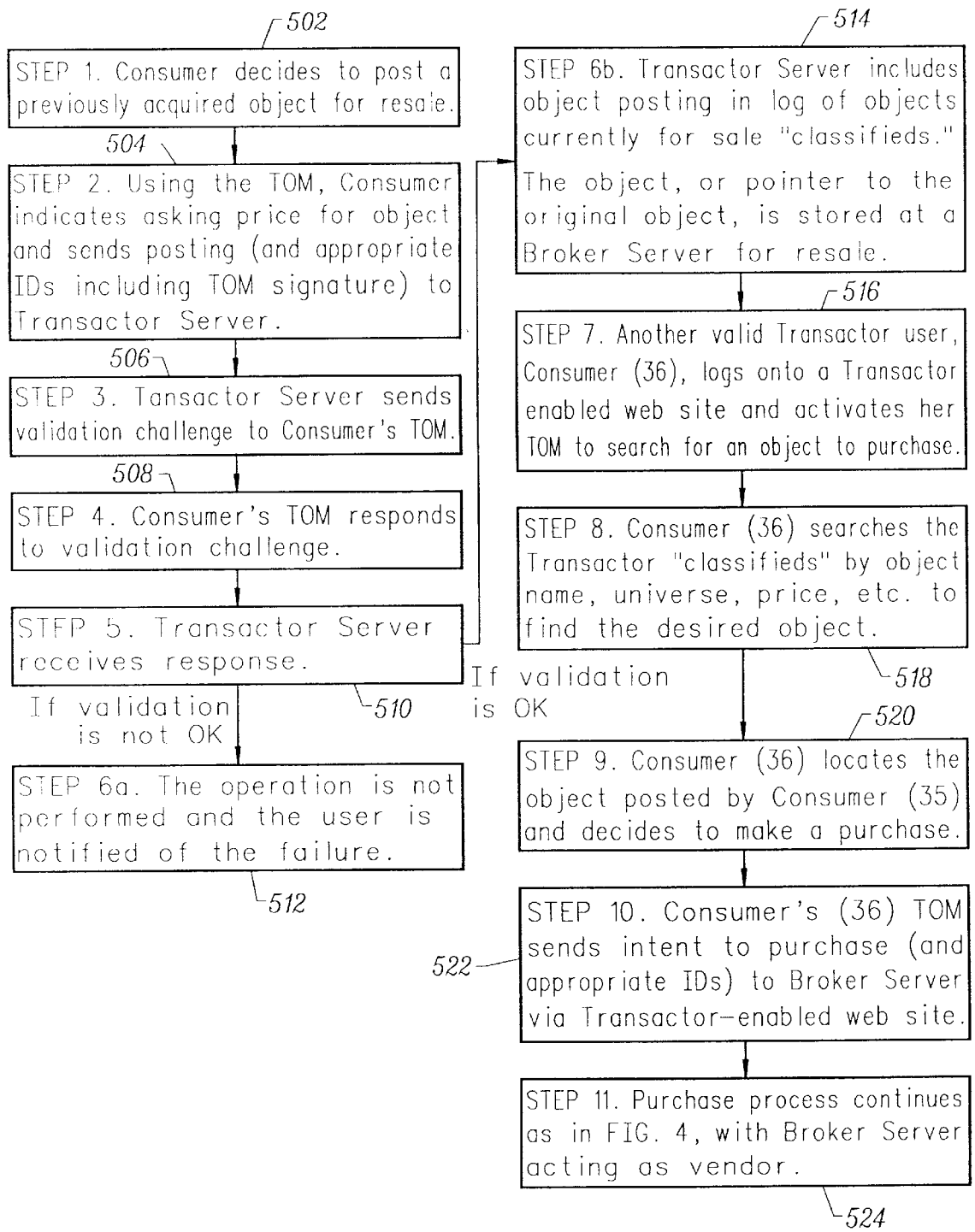
FIG. 7 illustrates a procedure for posting a previously acquired object for resale in connection with an embodiment of a virtual property system according to the invention.

The Sale of Previously Acquired Object Scenario (FIG. 7).

FIG. 7 describes the process in which a registered Transactor user posts a previously acquired object for sale. As illustrated in FIG. 7, the following steps take place:

In step 1 (at 502), the Consumer decides to post a previously acquired object for resale. Using the TOM, the Consumer then indicates (step 2, at 504) the asking price for the object and sends posting (and appropriate IDs including TOM signature) to the Transactor Server.

The Transactor Server then sends (step 3, at 506) a validation challenge to the Consumer's TOM. The Consumer's TOM responds (step 4, at 508) to the validation challenge. The Transactor Server receives (step 5, at 510) the response.

If the validation is not OK, the operation is not performed and the user is so notified (step 6a, at 512).

If the validation is OK, the Transactor Server includes (step 6b, at 514) the object posting) in a log of objects currently for sale "classifieds." The object, or a pointer to the object, is stored at a Broker Server for resale.

Another valid Transactor user, for example Consumer 36, logs on (step 7, at 516) to a Transactor enabled web site and activates her TOM to search for an object to purchase. Consumer 36 searches (step 8, at 518) the Transactor "classifieds" by object name, universe, price, or any other conventional search criteria to find the desired object.

Consumer 36 then locates (step 9, at 520) the object posted by Consumer 35 and decides to make a purchase. The TOM for Consumer 36 then sends (step 10, at 522) its intent to purchase (and appropriate IDs) to the Broker Server via the Transactor-enabled web site. The purchase process continues (step 11, at 524) as in FIG. 4, with the Broker Server acting as vendor.

Limited Edition Digital Object

The Transactor system allows for the ownership and sale of limited edition digital objects. An exemplary limited edition digital object (a "LEDO") 600 is illustrated in FIG. 8.

Figure 8:
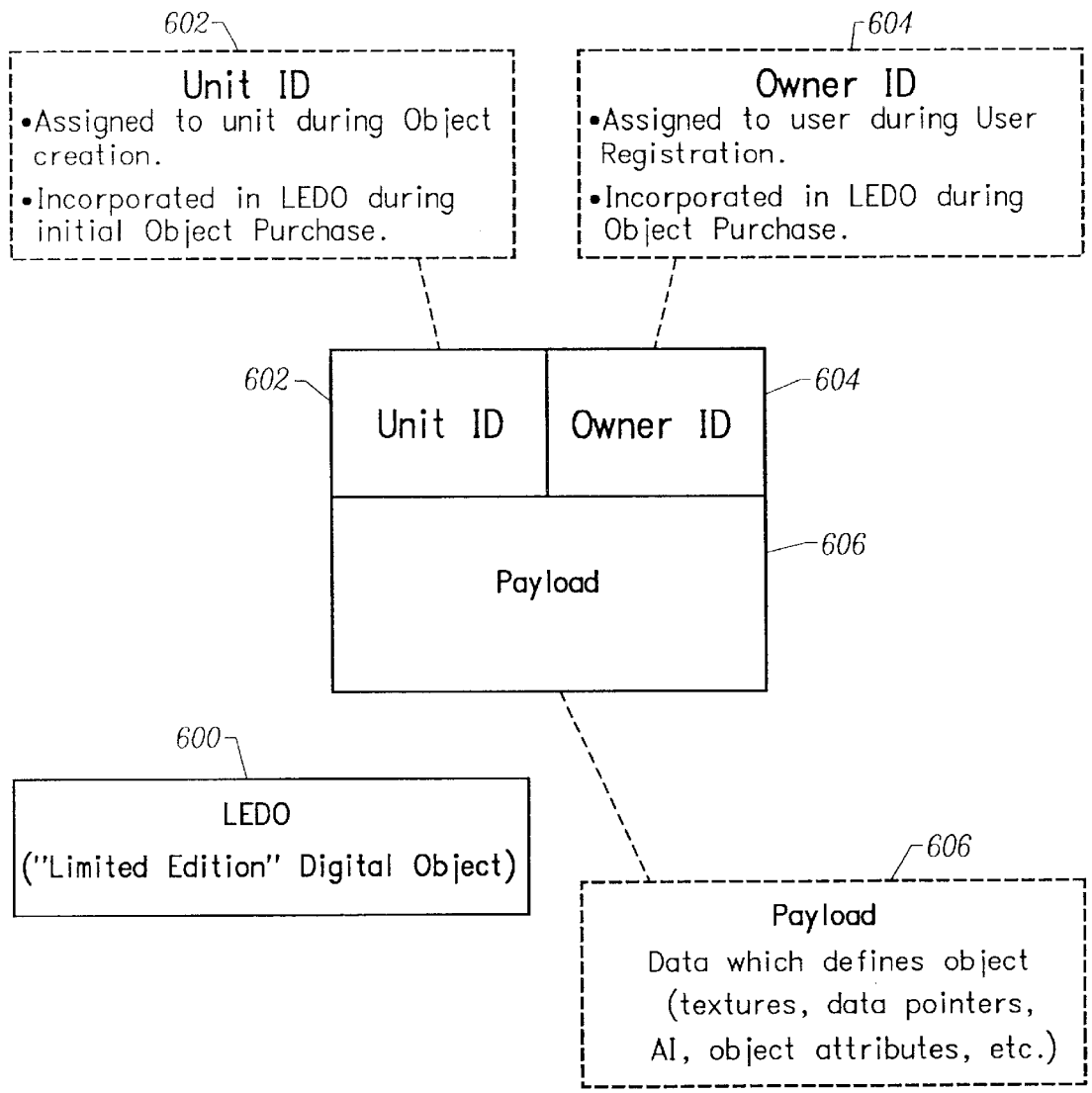
FIG. 8 illustrates the structure of a limited edition digital object used in connection with an embodiment of a virtual property system according to the invention.

As shown in FIG. 8, LEDO 600 comprises a payload 606, a unit ID 602, and an owner ID 604. Each of these elements are illustrated in corresponding dashed boxes. Examples of LEDOs for use in game environment in connection with an embodiment of a Transactor system comprise tools, characters, keys, spells, levels, abilities, behaviors. A variety of additional types of LEDOs for use with embodiments of a Transactor system will be apparent to those skilled in the art from the present disclosure. In this example, each LEDO has a unique, immutable unit ID, an owner ID indicating the current owner of the object and a payload comprising binary data which defines the object characteristics.

Unit ID 602 is assigned to the unit during object creation and incorporated in the LEDO during the initial object purchase. The owner ID, 604 is assigned to the user during User Registration and incorporated in the, LEDO during object purchased. Payload 606 comprises data which defines the object (e.g., textures, data pointers, AI, object attributes). In preferred embodiments, the objects are persistent such that they are accessible both when the user is in communication with a server (e.g., a game server) and when the user is not in communication with the server.

The number of LEDOs of a particular type can be closed or limited (e.g, the product run is capped at a predetermine number) or open-ended. The unit ID for each LEDO is assigned at its creation and is unique. The unit ID is immutable in the sense that a change in the unit ID for a particular LEDO can be detected and, in preferred embodiments, the LEDO loses functionality (e.g., it cannot be used in the relevant game world) if it has been altered. Additional Aspects of the Sale of Created Object Scenario (FIG. 9)

Figure 9:
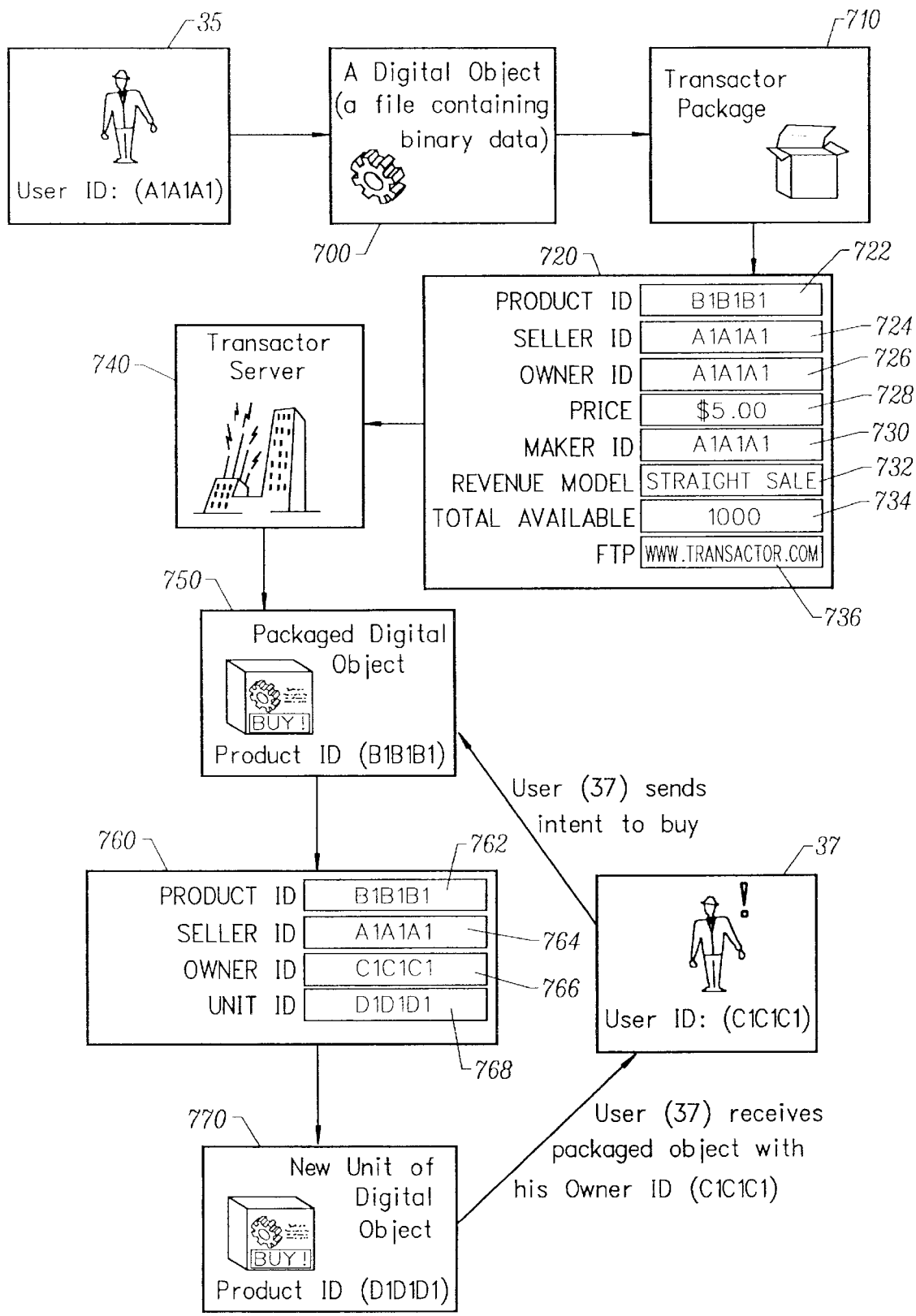
FIG. 9 illustrates aspects of a procedure according to FIG. 6.

FIG. 9 describes the process in which a registered Transactor user posts an object that he has created for sale in accordance with the previous description in FIG. 6. The following description of the steps in this process uses the FIG. 6 reference numerals and step numbers, along with the FIG. 9 reference numerals:

In step 1 (at 402), a registered Transactor user (e.g., user 35) decides to post an object that he has created for sale. The user the (step 2, at 404) logs into the TOM to "package" his object, the TOM enters (step 3, at 406) the user ID (e.g., A1A1A1) into the object package fields, and the user inputs data regarding, for example, price, revenue model, and number available.

The user logs on (step 4, at 408) to a Transactor Server directly or a Transactor-enabled service provider, and is validated by a Transactor Server.

Steps 1 through 4 above are further illustrated in FIG. 9 by User 35 (identified by code A1A1A1), digital object 700 (e.g., a file containing binary data), transactor package 710 which wraps the object as described herein, and data fields 720. Data fields 720 include a product ID field 722 for the identification code associated with the object (in this case, B1B1B1), a seller ID field 724 for entering an identification code associated with the seller of the object (in this case, A1A1A1), an owner ID field 726 for entering an identification code associated with the owner of the object (in this case, A1A1A1), a price field. 728 for entering the requested price for the object (in this case, $5.00), a maker ID field 730 for indicating the identity of the maker of the object (in this case, A1A1A1, the owner), a revenue model field 732 to indicate financial terms associated with the sale of the object (in this case, a straight sale), a total available field 734 indicating the total number of objects of this type that are available for sale, and an FTP field 736 indicating the delivery details for the object. In this case, for example, the field shows a URL for a web site from which the buyer can download his purchased object. The object is encrypted so that it can only be "unpacked" (opened) by the buyer.

The user then uploads (step 5, at 410) the packaged object and fields with instructions for the Transactor Server (illustrated at 740) to create a new product.

The Transactor Server (740) then verifies (step 6, at 412) that it received the data correctly, and proceeds to create a product (illustrated at 750), giving it a unique product ID (B1B1B1) shown in data field 762. The Transactor Server then sends (step 7, at 414) the unique product ID, and other product-related information, back to the user.

When copies of the product are sold, the Transactor Server will verify (step 8, at 416) buyer's (in this case, user 37) Transactor User status and the existence of available unsold units for the buyer-designated product ID.

If the validation of user ID or product ID is not OK, the operation is not performed and the user is so notified (step 9, at 418).

If the user ID and product ID are OK (step 9b, at 420) to produce a new unit of the product, the Transactor Server creates a new unique unit ID (illustrated at data field 768 and, in this case, D1D1D1) and assigns ownership of that unit from the seller (A1A1A1, illustrated in data field 764) to the buyer (C1C1C1 illustrated in data field 766) in its internal ownership databases and in the new object (relevant data is illustrated in data fields 760). The Transactor Server then packages (step 10, at 422; also illustrated at 770) the unit ID with ownership information and the digital product itself, encrypts portions of the resulting data, and sends the result to the user or informs the user where -the packaged object (illustrated at 770) may be downloaded. The Transactor Server also updates (step 11, at 424) all relevant accounts,) computes and distributes splits.

Trust Relationships

The illustrated Transactor system is predicated upon various trust relationships among the Transactor entities illustrated in FIGS. 1 and 2. These trust relationships are as follows:

1. Transactor Servers

A Transactor Server trusts other Transactor Servers to correctly authenticate objects and accounts which are outside its own knowledge. This trust is mutual.

A Transactor Server does not trust a Transactor User. Accordingly, a Transactor Server does not trust a game Server. All transactions and authentication must be valid according to the Transactor protocol rules, or a transaction request will be rejected. Both participants in any transaction are independently authenticated by the Transactor Server.

2. Transactor Users

A Transactor User trusts all Transactor Servers to give correct information about transactions, objects, and accounts.

A Transactor User does not trust another Transactor User, except to the extent authenticated by a Transactor Server.

3. Game Servers

Game Servers, like other Transactor Users, trust their Transactor Servers to perform valid ownership transfers, and to correctly authenticate user-accounts and object ownership. Game Servers also trust the Transactor Server to authenticate game objects themselves (i.e., detect data tampering), but only insofar as the originally registered game object was itself correct in the game universe. That is, if the originally registered game object was flawed or illegal for the game universe, it will be "correct" as far as the Transactor Server is concerned, but will be "incorrect" when the game server tries to use it.

Game servers need not trust their game users. In some embodiments, however, game servers may trust game users without a Transactor server authentication.

Game servers trust other game servers that help create the game universe.

4. Game Users

Game users trust game servers to "play a fair game" (i. e., follow the rules of the game universe). Game servers that do not play a fair game are unlikely to be successful in the game market, but there is no final Transactor arbiter of what constitutes a "fair game."

A game user need not trust another game user, except insofar as confirmed by the game server for the given game universe.

Transactor Brokering

This section includes a description of how, in an embodiment of a Transactor system according to the present invention, objects may be bought, sold, and traded using a mutually trusted third party (a broker) in order to effect transactions in other than real-time. For illustrative purposes, this is described in terms of a "game," the rules of which define a model of conventional real-world brokering and agency. A typical problem involving a game, game-players, and ownership transfer is first presented. This example is followed by a brief analysis of a "simple solution," which can be used in simple embodiments of a Transactor system. Finally, there is a discussion of brokers, their actions, rules, and how this solves the basic ownership-transfer problem when implemented in more complex embodiments of a Transactor system.

1. An Exemplary Game Scenario and Implementation Problem

This example involves a simple multi-player game, running on a server machine. The players own some Transactor objects, which reside on their own machines. A few players decide to play a game using some (but not all) of their owned objects, using the game server to run the "game world."

The rules of this game allow game objects (encapsulated as Transactor objects and initially existing on the player's machines) to be involuntarily "plundered" by the brute force or trickery of any player, as well as voluntarily traded away, or simply lost or dropped. In this game, possession equals ownership. Lost or dropped objects not picked up by another player are "owned" by the game (or game service provider). A Transactor server is contacted and a transaction (a Transactor ownership transfer) made each time a game-object changes ownership (e.g., it is plundered, traded away, lost, dropped).

To begin playing the game, users upload (or otherwise identify) their objects to the game server, which authenticates ownership and validity with the Transactor server. During play, an object changes hands, so an ownership transfer occurs, and the Transactor server is again contacted, with all the overhead such an ownership change entails. Each transaction also requires the owner's client machine to participate, since that is where the user's digital keys, required for ownership transfer, reside.

The basic problem is how a game server or anyone else in the above scenario can truly enforce transferring ownership involuntarily; that is, without the active assent of the object's original owner. Under ordinary circumstances, the owner cannot be compelled to use or disclose his private key and, without it, ownership cannot be taken away. Even if the game-client software running on the player's machine automatically responded to a game server request to transfer ownership, the user could have hacked the software to not permit ownership transfers. Thus, in conventional circumstances, the game server would have no way to enforce ownership transfer to the object's new owner.

One conceivable solution might be to have the game server certify to the Transactor server that a new player is the actual owner, and to somehow confirm that it really is the game server requesting this. This approach appears simple, but would require greater underlying complexity in the overall Transactor system. There would then be two kinds of transactions: a voluntary kind where both participants willingly state that a transaction should occur (normal sale or trade), and one where a third participant (the game server) says that a transaction should occur, even if the owner doesn't agree. This arrangement would also require that Transactor servers trust all game servers, thus opening up potential holes in the overall system security model and greatly expanding the required trust relationships in the overall system. It would also require that Transactor servers distinguish a game-server account from other kinds of accounts, and treat them differently.

In a large game with a persistent universe, this apparent solution would force the Transactor servers to process huge numbers of transactions (one for every trade, steal, plunder, or take), and require that the game servers certify that each involuntary trade was legal (to guard against fraud or hacking). All this network traffic must occur in real-time, or at least with an asynchronous capability. But that asynchronicity can propagate to any depth, since objects may rapidly change owners again before a prior ownership transfer has completed. This quickly leads to a large "roll-back" problem that a game server must handle on its own.

2. The "Simple" Solution

In some embodiments, to solve the above-described problem, a game player gives a "power of attorney" privilege to a game server during game play, and rescinds it when the game ends or the player withdraws from play. Under these "powers of attorney," the game server takes ownership of every object brought into play, keeping track of the "true" owner. The game server then runs the game according to its rules for who owns what and how they got it, and finally resolves end-game ownership by transferring the objects to their most recent game-level owners.

During game play, the game server must tag each object with it's current "designated owner," starting with the ID of the original owner. The game server still owns the object, as far as the Transactor system is concerned, so the designated owner is just a part of how the game is played. The tag is simply the Transactor user-ID of whoever has game-level ownership of the object. Plundered objects are tagged with the user-ID of the plunderer. Objects traded voluntarily are tagged with the new owner's ID. Lost or dropped objects are tagged with the Transactor user-ID of the game itself (i.e. the game service provider's ID). When a player withdraws and takes his objects out of play, the game server (which owns all in-play objects) transfers actual Transactor-level ownership to the player. If a player's connection goes out, the game server maintains the "designated owner" tags, subject to plundering by other players within the game context.

This arrangement requires only that game players trust the game server, which is already required as described above. No additional trust is required between game servers and Transactor servers. All transactions still involve only two equal parties. The Transactor server need not distinguish between game-server ID's and ordinary-user ID's, nor treat any user in a special way.

One downside to this arrangement is that, if a game is played and no objects change "true" owners, there is an initial ownership transfer from the players to the game server, plus a closing transfer back to the original owner. In embodiments employing this "simple solution," there is no way to avoid this, because without it the game server has no enforceable authority to transfer objects that are in play. Fortunately, this activity is largely confined to game startings and endings.

These "power-of-attorney" transfers can occur asynchronously at the beginning of the game, but players will probably want them to occur synchronously at game-end. Mid-game "cash-outs" that remove objects from play (assuming the game rules allow this) can be performed asynchronously, to minimize impact on game play. In some embodiments, servers spawn sub-processes or call on concurrent server-side programs to perform cash-outs synchronously, rather than burdening the game-program with such non-game details.

In some embodiments, a game server provides "free parking" to game players who want to keep their objects on the server and avoid most uploading and downloading. The server retains ownership of the objects, but they are not active in any game. These "parked objects" are not available to the player for out-of-game trading, but can be reacquired by the player at any time.

3. Brokers and Brokering

The term broker in this description refers to any mutually trusted third party who acts on behalf of two other parties to effect some pre-determined action. A broker is trusted to act on behalf of the original authority, but only within the boundaries defined at the time of the brokering agreement, and only for specific designated objects. In order to actually complete a transaction, both participants in the brokered transaction must trust the brokering agent to act on their behalf. Thus, a broker is a mutually trusted intermediary in a transaction that occurs between two other individuals, neither one of whom need trust the other.

As described below, a Transactor Server provides a means by which an individual may grant trust to another individual in the Transactor system. This will become clear from the following description of a "brokering game."

In a "Brokering Game," a broker is an agent. Its actions result in a safe trustworthy transaction between two other parties, who are the "players" in the Brokering Game. A broker operates on an object, acting as intermediary in transferring ownership between the original owner and the buyer. Users (players) in the Brokering Game participate voluntarily, and willingly transfer ownership of their objects to the broker with the understanding that they will get them back if the broker does not sell the object.

The Game Universe of the Brokering Game consists of all the objects that a given broker has for sale or trade, and the identity of each object's original owner (the "designated owner"). The Brokering Universe may also contain requests by players for the broker to seek out and obtain a certain kind or class of object. These requests would require a more sophisticated Brokering Game program.

There may be any number of different Brokering Game Universes running at once, on any number of different servers from different providers. They need not communicate with one another directly, since each is only responsible for its own objects and players (users).

Any particular instance of the Brokering Game may charge a fee to "play". That is, it may charge a fee in order to broker a transaction. This fee is different from the Maker's Fee computed by the Transactor Server. Fees are defined by whoever creates a particular Brokering Game.

Brokers are typically-connected through the Internet to a number of other brokers (although they need not be). These brokers may communicate requests to one another in order to complete transactions. These inter-broker communication protocols are yet to be defined, but must be standardized for all brokers.

Brokers that do not communicate directly with other brokers behave as simple public or private store-fronts for the sale of their users' objects (sort of a "consignment store"). This may entail a web connection (HTTP server) in addition to the brokering services, or it may be a "closed game" in which only registered users can log on and participate. That is a decision to be made by the game designer. It is not a Transactor rule or law.

The basic rules of the Brokering Game, or of any other game which acts as a broker for its users, are as follows.

(1) All objects actively being brokered must first have their Transactor-ownership transferred to the broker itself. This confers the power to sell the object on the brokering agent and have the ownership transferred to the buyer immediately, without requiring the original owner to participate directly or in real-time.

(2) The broker can own objects that are not actively being brokered because one or more criteria of the brokering agreement have lapsed. For example, an agreement may place an end-date beyond which the object cannot be sold. Since the user will probably not be logged in at that exact moment, the broker must immediately take the object out of active brokering "play", and hold it in "parking" or "escrow" until the user reclaims the object. The broker can't simply email the object back to the owner, because the owner's keys are required for the ownership transfer.

(3) players must trust the broker to return unsold objects on demand, or according to some predetermined criteria, such as after an expiration date. This requires that the broker keep a record of the original owner, along with all necessary relevant Transactor information about the owner, and the criteria of the brokering agreement. The broker must return these objects as requested by the original owner, as authenticated by a Transactor Server.

(4) Brokers must notify the original owner with a due haste when an object has been sold. This is more than just a courtesy to players, since the original owner may be a game server that requires some real-time notification of a sales transaction in order to run its game in something approaching real time.

Brokers should also notify the original owner when one of the limiting criteria of the brokering agreements lapses, when the brokering agreement itself expires, or some other criterion takes the object out of active brokering "play.

The basic rules of brokering given above define a fundamental set of ground rules by which brokers act for users. But they are not limited just to game servers that only play the Brokering Game. If any game implements these rules using a game-as-broker design, it can act as a broker on behalf of all its users, for whatever purpose the game designers choose. One important such purpose is to implement "plundering" (also called "stealing") and borrowing within a Game Universe.

Plundering is a game rule that allows a game user to gain ownership of a Transactor object simply by taking it (possession equals ownership). Normally Transactor objects are useless to those who would simply take them (i e. copy the file), because the object itself is encrypted under the owner's key, and because a Transactor server would disallow the object's use except by the owner. If, however, a game universe acts as a broker, then it owns all objects that are in play, and no Transactor server is needed to "change owners". Instead, the game servers maintain a "designated owner," which starts out as the object's original Transactor owner, but may be altered according to the game rules for plundering when another user encounters the object. Since the game server is acting as a broker, the player who brings the object into play must voluntarily transfer ownership to the game server, fully agreeing that the game-play rules determine who will eventually get actual Transactor-certified ownership of the object. If the game design allows objects to be taken out of play, then the most recent "designated owner" receives actual Transactor-certified ownership of the object, and receives the object from the game-as-broker, not from the object's original owner.

Borrowing is a game rule or rules that define how an object may be used by someone other than its owner, and perhaps how ownership of the borrowed object may be transferred without the owner's direct permission should the borrower "lose" the object. As with plundering, the game server acts as a broker and actually owns the object as far as a Transactor server is concerned. Thus, any rules that the game designer makes will be carried out on objects already owned. Also as with plundering, there is a "designated owner" who can take the object out of play and become the "actual owner" (i e. the Transactor-certified owner). A borrower would typically be prevented from taking the object out of play by the game rules. If this is not done, then there is no difference in fact between a borrower and a plunderer (since possession would equal ownership), and a borrower would simply be a plunderer to whom you gave the object voluntarily rather than involuntarily.

Other games that involve brokering comprise the following:

(1) Sales: More than just a neutral broker, a Sales agent would earn its fee by actively seeking out buyers for the goods it has been charged with selling. Like any broker, it owns the goods it is trying to sell, at least according to an authenticating Transactor server. The "designated owner" is the individual who wants the goods sold, and to whom ownership will revert according to the agreed-upon rules and constraints, should the item not be sold.

(2) Collectors and Searchers: A collector agent would seek out sellers of goods described or designated to it by its users. It would then buy or trade to acquire those goods, according to the instructions it was given by a particular user. A Collector agent may have several users who all want the same object. The arbitration rules for deciding who actually gets an object are for the designer to define. They are not a Transactor law or rule. First-come first-served is one example of such a rule. Highest finder's-fee is another. Bribery might be another. These are all valid Collector rules in the Transactor universe.

(3) Gambling/Gaming: A casino or gambling house acts as a broker for its patrons. It may charge a fee, or it may take a cut of winnings, or any other arrangement. The objects wagered can be private currency or barterable objects, depending on the house rules.

The above rules of brokering can be altered to give different fundamental play experiences. For example, if the "designated owner" concept was eliminated, then all objects brought into play would be in one large pool of unowned objects. A raffle or other gambling situation might then distribute objects based on some game-play rules, or just randomly. In this game, players would be willing to relinquish all ownership claims to an object in the hope of getting some better object brought into play by someone else. The game broker would retain ownership of all unclaimed or unwanted objects. Users would have no expectation of getting any of their own objects back.

Some brokering agreements may ignore the "return on demand" rule, and only return objects to their owners when the brokering agreement expires. Certain commercial operations such as auction houses might need this rule variation, to guarantee to bidders that an object remained "in play" until all bids were in or the brokering agreement expired. This would apply for real-time as well as delayed auctions. These agreements will also probably have a minimum price that the object must be sold for, just as real-world auctions do.

Services, Capabilities and Support Modules

Services, capabilities, and support modules used in an embodiment of a Transactor system according to the present invention are set forth below, along with a description of how these elements interact to produce the desired outcome.

It will be apparent to those skilled in the art, based on the present disclosure, that embodiments of Transactor server and client software may be implemented in many computer languages such as, for example, C/Ca or Java, and that embodiments may be implemented in a manner that is portable across Window/Windows NT and selected UNIX environments.

1. Transactor Elements and Services

A Transactor system according to the present invention can be broken down into several elements and services. The primary division is into client-side elements (termed tools) and server-side elements (termed services). Some elements, such as embedded applets, can be viewed as lying somewhere between these two elements, because: they Originate from and communicate with a server yet run and operate on a client machine.

A tool is a distinct identifiable program or capability residing on a client's computer. It is invoked directly by a user to accomplish a specific purpose. It is more like a tool in a Word toolbar, rather than like a command-line tool in Unix.

Publicly accessible server-side elements appear simply as services on a network, with no specific requirement that they be implemented as separate server processes on a particular server machine or cluster of machines. A particular service may be provided by a class or thread within a single server program, or by a distinct server process on a machine, or by a group of server machines, or even or by a distributed self-updating service like the Internet's Domain Name System (DNS). As long as the client users and other servers know how to obtain the service, the details of providing it can vary.

In addition to supplying or integrating with Transactor services, a typical Transactor merchant will also need to supply other conventional vendor services as appropriate (e.g., a sales mechanism or metaphor, a stocking mechanism, billing).

2. Transactor Client-Side Tools

Transactor client-side tools, discussed below, reside on and run from the client's machine. Preferably, they are not embedded in web pages. A wide variety of techniques for constructing the below tools will be apparent to those skilled in the art, based on the present disclosure.

(a) Object Manager: The object manager collects objects into lists and groups, examines) or browses objects, including unowned ones, etc. This is the "root" Transactor tool from which all other actions (owner acceptance, wrapping, unwrapping, etc.) can be performed.

(b) Owner Acceptor: The owner acceptor accepts a password or pass-phrase typed in, applies it to a Transactor "keychain", and allows use of resulting Transactor keys, if successful. In some embodiments, this tool is implemented as an inherent part of the Object Manager.

(c) Object Trader: The object trader enables an accepted owner to engage in object trading (selling or buying) directly with another Transactor user. In some embodiments, this tool is implemented as an inherent part of the Object Manager.

(d) Wrapper: The wrapper wraps a raw digital object (which may be an existing digital object in the user's possession or a digital object newly created by the user) with an owner's Transactor info, resulting in a Transactor object.

(e) Unwrapper: The unwrapper unwraps an owned object, resulting in a raw digital object and a separate file holding the data from the Transactor fields.

3. Transactor Server-Side Services

These services are provided to both end-user clients as well as to other distributed servers that need intermediate access to the service (i.e. vendor-servers subscribing to the Transactor services). A wide variety of techniques for implementing the below services will be apparent to those skilled in the art, based on the present disclosure.

(a) User Registrar The user registrar register new users, issuing Transactor ID's (TID's); allows registered users to edit their info; and responds to a Bookkeeper's requests to validate TID's. It does not validate objects or ownership, only the identity of users.

(b) Bookkeeper: The bookkeeper receives, confirms, and logs all transactions and transfers of objects; maintains accounts (distributes splits to other users, etc.); and performs collect-and-forward transactions to other mercantile servers (bank-cards and bank-deposits).

(c) Object Registrar: The object registrar register new objects, issuing Object ID's (OID's); validates objects and ownership thereof, for Bookkeeper; and performs ownership transfers in support of Bookkeeper.

4. Vendor's Server-Side Services

In some embodiments, a Transactor vendor will have utilize a Storekeeper service, which keeps an inventory list; keeps a sales log of transactions; and communicates with the User Registrar, Bookkeeper, and Object Registrar.

(a) Transactor Support Modules:

The above tools and services are built upon a common set of support modules. A module should be treated as a related set of facilities or capabilities, not necessarily as a software-design element corresponding to a library, package, or class. The core support modules are:

Database Module

Cryptography/Security Module

Transactor-field Module

Logging Module

Financial Module

Not all client-side tools or networked services will use every support module, but they all use the same module whenever there is a need for shared data. For example, all parts of Transactor use the same cryptography and Transactor-field modules (and the same revision-level thereof); otherwise any exchange would appear as gibberish to one side or the other.

Networking software may be provided either as a standard library (e.g., as for C or C++), or as a standard part of the language system (e.g., as for Java).

(b) Database Module:

All information about transactions, users, objects, etc. is kept in databases. Because some information is very valuable or sensitive, while other information may change at a rapid rate, several actual databases preferably, are maintained, rather than a single. all-encompassing database.

(c) Cryptography/Security Module:

This module is responsible for encrypting and decrypting all Transactor objects and communications. It is also responsible for generating unique cryptography keys, Transactor ID's, and Object ID's. Finally, it validates a password or pass-phrase entered by a user to gain access to the Transactor "key-chain" file (i.e., it provides client-side key-management functions).

(d) Transactor-Field Module:

This module allows other modules to read or write the Transactor fields of a given object's Transactor wrapper independent of any actual game or other use. This module also performs wrap and unwrap of raw digital objects.

(e) Financial Module:

Using the values from an object's Transactor fields, as received from the Transactor-Field Module, this module computes splits, fees, etc. for all the participants in a sales transaction according to an object's predetermined Revenue Model. This module also distributes those amounts to each user account in the database, and writes entries in the log. This module also interfaces to third-party "bankware" to perform payments and billing of all user accounts. A policy is defined so as to determine when, how often, at what amount, what activity level, etc, to actually initiate a banking transaction involving the bankware.

A Revenue Model is a server-side software element that determines how revenues accrue to Owners, Makers, etc. In some embodiments, it is preferable to define several standard Revenue Models. In some embodiments, a "plug-in" type architecture for additional Revenue Model components is also used.

(f) Logging Module:

A log provides a complete serialized list of every change to any Transactor database. This acts not only as a backup in case of database corruption, but also as an independent accounting audit trail for all transactions. The Logging module maintains several such logs, serving different purposes as outlined in more detail later. Most logging occurs on the server-side, but a client-side Logging Module is responsible for logging a user's transaction history in the local transaction log. This is purely for user information purposes.

Additional Features of Modules

1. The Cryptography/Security Module

Cryptography provides several features within Transactor data invisibility, data integrity, authentication, etc. Data invisibility means that the data is not visible to any but an authorized user/owner. This is accomplished with encryption. Data integrity means that data can be determined as being in an untampered form. This is accomplished with secure hashing and digital signatures. Authentication means that two parties who do not trust each other can each determine that the other entity is who it claims to be. This is accomplished with authenticating protocols that may employ encryption, hashing, digital signatures, etc.

This module is responsible for encryption and decryption of objects and other data, as well as creation of cryptography keys. A Transactor ID and an Object ID are part of the authentication system and, preferably, are uniquely identifiable and cryptographically secure. User ID's may simply be sequentially assigned numbers, from a pre-determined range allotted to a particular Transactor server. Uniqueness is the only requirement. Object ID's may include a sequentially assigned number, as well as hashed information about the object's contents, maker, registration time, etc. These values are essentially impossible to forge or fake, nor do they allow an altered or forged object or user to be improperly recognized as valid. Since the user and object databases contain every known ID, all objects and users can always be verified.

A Transactor user's data may change over time, such as from a change of address. This does not after the originally issued Transactor ID. The registered user simply enters the new data, while using the same ID originally calculated and assigned.

A Transactor object does not change over time, so its Object ID (or a related message digest or hash) can always be recalculated to verify that it has not been tampered with.

This is how objects can be verified as unaltered even without transferring their entire contents to the Transactor Bookkeeper service.

The fact that objects are, in this sense, immutable once registered does not prevent time-varying properties from accruing to the object. It only prevents that variable property from being verified by the Bookkeeper. For example, a game weapon may have a variable power level, but that variable must be kept outside the "wrapper" provided for Transactor object validation. The weapon itself may define internal constants that limit valid power levels, and these would be inside the wrapper to prevent tampering. Thus, the worst effect from tampering is to gain a full power level.

One variable property that the Bookkeeper does track is existence (e.g. was the object destroyed). Destroyed objects are still kept in the database, but are marked as destroyed (or are moved to a separate "destroyed" database). This makes such objects recognizable but unusable. An administrator may enact a retirement policy that removes the majority of a destroyed object's data after some period of time, to keep database size manageable. As long as Object ID's, message digests, or hashes are retained so an object can be recognized as destroyed, the object's entire original data-package need not be preserved.

2. The Transactor-Field Module

Every Transactor digital object preferably contains several data fields in the object itself that identify the object and its owner, its original creator, the revenue model, and how sales splits are computed. The Transactor registered-object database holds the correct values of at unalterable fields, so any tampered field can be easily identified and set right.

Other Transactor modules use the Transactor-field values to determine how to handle the object, or how to handle transactions involving the object. This module provides uniform access to all readable fields, and constrained but uniform access to writable fields. For example, anyone can read the Current Owner field and retrieve the ID kept there, but only the accepted and verified owner can write to that field. But even the owner can't do everything. An owner can set a new price, but can't change the Maker or Split fields. The latter can only be changed by the original Maker.

3. The Financial Module

The Financial Module acts as the intermediary between Transactor transactions and actual banking or payment-system (bankware) transactions. This module's main purpose is to calculate and distribute the fee splits designated by the object being sold. In the simplest case, this is basically a "calculate and forward" module, and every Transactor transaction immediately results in one or more bankware transactions. Such a simple implementation might not even need to keep any account-balance information of its own, instead relying entirely on the bank-maintained accounts to determine a user's balances.

A more sophisticated Financial Module might instead maintain its own "summary" accounts for every user, and only perform bankware transactions at the end of the day, and only for those accounts whose resulting daily balance was larger than some predefined amount (e.g. more than $2.00 credit or deficit), or had gone longer than 30 days without a transaction. By aggregating the bankware transactions in this way, users and vendors are spared the overhead of large numbers of tiny banking transactions. The detailed transaction logs and the corresponding reporting tools provide a complete audit trail to determine every detail that went into any aggregated banking transaction.

In such a "summary account" system, the user's current account balance is either a positive or negative amount. At the end of each day (or other policy-defined billing period), the current balance is zeroed out, and translated into an appropriate credit deposit or debit charge against the user's designated outside financial accounts. That is, a single bankware transaction occurs. If the amount is small enough, it is simply carried forward to the next billing period and no bankware transactions are performed for that user's account. The precise details of 'small enough", as well as other particulars such as a small balance carry for a long enough period of time, will be determined by further research or an arbitrary decision in the design. In any case, these parameters must be tunable.

There are advantages and disadvantages to any particular Financial Module design, anywhere along the continuum between the two possible methods presented above. These benefits and risks must be completely enumerated and analyzed in further Financial Module design. In particular, issues of security, expected server load, and customer or bank liability will be considered, along with any legal or financial responsibility requirements.

A Revenue Model is a software element that calculates how ownership transfers generate revenue for sellers or makers. A Revenue Model is designated by an ID in the Transactor object itself, designated when the object was created by its maker. The Revenue Model software component is passed information about the object, the sale price, etc. and is responsible for calculating how much of the sale price goes to seller, maker, broker, etc. These values are then returned to the main Financial Module for actual disbursement. Thus, the Revenue Model software component has no knowledge or interaction with accounts, bankware, etc. It only calculates shares in a revenue stream.

The above variations in underlying design should not be interpreted as uncertainty in the Transactor design or bankware interfaces. Rather, they should be treated as available options or modules determined either by the vendor who installs a Transactor system, or as required to support different payment options that may operate under different constraints (e.g., credit-cards, debit-accounts, DigiCash).

4. The Logging Module

Depending on the capabilities of the database selected (for example, Oracle), most data collected and processed by the different Transactor services is kept in redundant form. The primary storage facilities are the various databases. Redundant information is kept by time-stamping and logging every transaction that alters any database. This log acts as both an accounting audit trail and as a backup mechanism.

As an audit trail, the log can be searched (off-line using yet-to-be-defined tools) to discover reasons for problems like, for example, account balance disparities or contested purchases. It also clearly shows the time at which each transaction was made.

As a backup mechanism, the log can be used to restore the databases should they become corrupted. This is accomplished by starting with a valid backup database and sequentially applying every logged alteration. The result is an up-to-date database. In the safest setup, all log files are kept on a different physical hard disk than the database files.

Note that separately implemented logging facilities may be eliminated as redundant, as fault tolerance services of the Oracle database may more easily or simply meet these requirements. However, the logging module is nonetheless described here to illuminate the required functionality.

Rules of Logging

Log-files must always be secured—they hold sensitive or valuable data.

Data is only appended to a log-file, never deleted.

Every log-entry is automatically time-stamped with its entry-time into the log.

Every transaction is logged, both valid and invalid ones.

One log entry may correspond to several changes in the databases.

Log-file formats should be compact (i.e. binary, not ASCII text).

Note that even rejected transactions are logged, since they indicate some kind of problem (data loss, theft attempt, etc.). To prevent the log file from growing too large, the Logging Module can switch to another log-file at any time, under administrative direction (manually, at a scheduled time (e.g. midnight), etc.). A log-file switch is performed using the algorithm outlined below. Log entries received during the switch are queued up and eventually written to the new log-file. The logger must never overwrite, truncate, or delete a file itself. If It fails to create a new empty unique log-file, it will refuse to switch log files.

Log-files need not be kept forever. They can be moved off-line after some period of time and retained only until their backup media is reused. The scheduling of this should be one of the policies determined by the Transactor administrators or owners, and implemented as a configuration option of the Transactor software.

Since log-files contain valuable sensitive data, they must be kept secure at all times, even when off-line. Log files may be encrypted to protect against possible snooping. This option must only alter the data written to the log, not any other aspect of its nature.

5. Log-File Switchover

A log may be 'reset' so that log-files do not grow too large. This does not actually delete any data from the log. Instead, the logger switches to a new log-file, leaving the prior log-file intact. Failure at any point aborts the log-switch, and logging continues in the original file, with a log-entry made that a log-switch failed. This switch is accomplished as follows:

0) a memory-based queue is created to hold log-entries received during the switch. Entries are time-stamped with their entry-time into the queue.

1) a new file is created under a temporary name. It will be automatically renamed after a successful log-switch has occurred. Failing file creation, no log-switch occurs, so stop now.

2) On successful file creation, a transfer time-stamp is made. This time-stamp will be used in several following operations.

3) A "transfer entry" is written to the new log file, stamped with the transfer time-stamp.

4) The prior log-file is written with an identical "transfer entry", and the file is flushed to disk.

5) The prior log-file is closed.

6) The prior log-file is renamed by appending the transfer time-stamp to the existing name, in an acceptable ASCII format (i e. no illegal characters for the machine).

7). The new log-file is renamed to the old log-file's name. Depending on the platform, this may require closing the new log-file, renaming it, then reopening it and seeking to the end.

8) The new log-file is written with a "linkage entry" noting the new name of the prior log-file. This entry is time-stamped with the actual time of log-switch completion, not the earlier transfer time.

9) All queued log-entries are appended to the new log-file.

After completion of the above steps, the old log-file can be moved off-line, or to backup media, or whatever. New log entries will be appended to the new log-file, which starts out with at least two entries: the transfer entry and the linkage entry. Any log-entries received during switchover are also in the new log-file.

Transactions and Transaction Records

A Transactor transaction occurs whenever ownership of an object is transferred from its current owner to a new owner. A transaction record is the collection of data that describes all the entities involved in that transaction and the type of transaction requested. Transaction records can be valid or invalid, solely depending on their contents. A critical Transactor service is to recognize and prohibit all invalid transfers by rejecting invalid transaction records. It is the Bookkeeper that performs this service, with support from the Object and User Registrars.

A transaction record basically looks like this:

Type: Seller sold Buyer this Object on Date for Price, by time X; signed by Seller, then Buyer.

This directly translates into a data representation format:

T: S sold B this O on D for P, by X; signed: SS, BB.

T is the type of transaction record, identifying the rest of the data for the Transactor server. S is the Seller's TID, which must also be the original owner of the object. B is the Buyer's TID, which will be the new owner of the object. O is the transferred object's unique Object ID (OID), or some yet-to-be-determined unforgeable token representing the object itself (e.g. a message digest or secure hash). D is the date and time (expressed in GMT for uniformity) at which the transaction occurred. P is the agreed-upon price, if it was a sale for money as opposed to barter. X is an expiration-time a short time after the transaction record is completed. Its purpose is explained below. The entire transaction record is then digitally signed by the Seller SS, then by the Buyer BB. This collection of data is then sent to the Bookkeeper service for validation and approval. If approved, the given object's ownership is transferred to the buyer, and the new ownership is recorded in the database. If rejected, there is no ownership transfer, but the Bookkeeper retains the record so it can detect patterns of fraud or other difficulties.

The Seller constructs the transaction record and fills in all fields, then signs it. The transaction record is then sent to the Buyer, who decrypts it, verifies the Seller's signature, then signs it, encrypts it again, and sends it to the Bookkeeper service. These last steps requires the Buyer's cooperation, so the Seller must trust the buyer to actually sign and forward the transaction record. Without the expiration-time X, this would be a security flaw, since Sellers are not required to trust Buyers. Adding an expiration-time declares a deadline after which the transaction record is automatically invalid, so the Seller is no longer entirely dependent on the Buyer's good behavior. The Buyer must submit the transaction record to the Transactor server before this deadline, otherwise it will be rejected, even if all other data is correct. This deadline prevents the Buyer from holding the Seller's object "hostage" for an indeterminate time, effectively preventing its sale or use elsewhere. After the deadline, the Seller can sell the object to someone else without fear that a bogus delayed transaction record will be sent in by an unscrupulous Buyer. A short deadline (say 30 seconds) can be used as the initial time-out, but if network delays cause rejection, this can be automatically increased by some increment up to some reasonable upper limit (say 3 minutes) that both Seller and Buyer agree on first.

Because both the Buyer and the Seller sign the transaction record with their private digital-signatures, neither one can later claim ignorance of the transaction and demand that ownership be restored tie the protocol provides non-repudiation). If either one detects cheating or improper data using its own knowledge, it can simply refuse to sign the transaction record. Both signings are voluntary.

In preferred embodiments, rather than validating individual users or objects, only entire transaction records are validated. If any part of the transaction record is invalid, the entire transaction is rejected and a reason returned. If the complete transaction is validated, then approval is given, and the clients then transfer the data.

When a transaction record is rejected, it can be for various reasons. Invalid ID's for any participant is one reason, invalid signatures is another, and unintelligible data is yet another.

Some reasons may be embarrassing for either Buyer or Seller, such as "insufficient funds", so not all reasons for rejection are sent to the clients, only some. A detailed design must list all rejection reasons and which are sent to clients. When a transaction record is accepted, the Bookkeeper tells the Financial Module to calculate and distribute sales splits, fees, etc. It also updates the object and ownership databases to reflect the resulting object transfer. All intelligible transaction records, whether accepted or rejected, are logged to a transaction log-file. Certain patterns of rejections may send a security notification to an administrator, or take some other predefined action. Garbled transaction-record attempts are not logged to the transaction log, but may append an entry to a "problem with host H" file for later perusal and action by an administrator.

1. Identifying Authentic Objects

The value of O in a transaction record must be something more than just the OID of the object. This is to prevent various fraud schemes whereby having an object's ID would be equivalent to having the object. One way to avoid such problems is to have the O value be a collection or composite of several values that not only identify the object, but also act as an assurance that the object is really in S's possession, and really owned by S. One part of this composite is the OID. The "assurance value" needs to be something that can only be calculated by the object's true owner, such as a message-digest of the object's decrypted contents (only possible for the owner and the Bookkeeper) combined with the values for B and D to introduce unpredictability. Without the unpredictable values of B & D (and perhaps some other random strings), a cheater could have precalculated the object's message-digest, and it would never change even after the object was sold or destroyed. Thus, the main reason for using a message-digest would be lost.

2. Transaction Types

Although entire transaction records are the only thing validated by the Bookkeeper, each transaction record has a type identifier in it, and certain idiomatic patterns of data in the records. Here are some obvious forms, although there are probably more that are useful.

All the following patterns have idiomatic values defined in the transaction record formed as:

T: S sold B this O on D for P, by X; signed: SS, BB.

Only the idiomatic distinctions are pointed out, while all other fields retain their normal meaning. In particular, the D field always contains the date/time of the request, and the content are always signed by at least one participant. Some fields have no meaning outside of sales transactions, such as the price P, which is zero on all the following.

Verify a User (TID) S is the user making the request. B is the TID being checked. O is all zeros. The record is only signed by SS. An "OK" response means that B is a valid TID. Rejection may mean any error.

Validate an Owned Object S equals B, and is the user making the request. O is the object identifier/digest. The record is only signed by SS. An "OK" response means that the object is valid and is owned by S. Rejection may mean any error.

Validate an Unowned Object S is all zeros. B is the user making the request. O is the object identifier/digest. The record is only signed by BB. An "OK" response means that the object itself is valid, but its ownership t undetermined. This prevents non-owners from inferring another user's owned objects by probing with valid Object ID's. Rejection may mean any error.

Special Object Properties and Situations

The Transactor software system is a flexible general-purpose system for establishing ownership and for conveying products and payments. It is not limited to real-world monetary transactions, nor to purely digital objects. Following are some specialized features that are available, in some embodiments, as options to Transactor service providers.

1. Preview Objects

When an ordinary user is offering an owned object for sale or trade, it is useful for the buyer to examine the on-screen representations of the actual object tie. its image or sound) on his own machine. These may be beauty shots or the actual images that are part of the object. It does not include any of the object's behaviors, however.

These previews are one use of a special property that can be given to a Transactor object: the transient property. Transient objects provide a mechanism to allow exchange of data between users or client and server that exploits the security and consistency of the Transactor protocols, while not transferring ownership or utility to the receiver. Transient objects cannot be stored in a users inventory, and they automatically disappear when the connection with their originator is broken.

To create a previewable object without transferring the entire real object (which could be much larger), the original complete object may contain or refer to a small embedded transient "preview" of itself which can be separately extracted and sent to the prospective buyer. This transient object has no value, is unusable in play, and cannot be traded or retained in the user's inventory. It is purely for examination before purchase. Its Object ID does not exist in any Transactor-server database, since it is created on-the-fly, so it cannot be traded.

Not all Transactor objects must contain previews. The user may already have all the previewable images or elements possible for a game or other scenario (e.g. on the original CD-ROM), and it would suffice for the buyer to know that a Model X41 Laser Pistol was being offered. The software would then load the previewing images or other representations from the buyer's local machine (hard disk or CD-ROM), and no preview object would be needed.

2. Membership Cards

In principle, a membership card is a persistent "entry visa" to other services or privileges. It is persistent in that it cannot be spent or expended like currency, and has no inherent value as currency (but may have collectible value). It allows entry or access to services, because the service provider can see the user present a valid card. Membership cards usually have an expiration date, nor are they transferable to another user except by the issuer. A passport is one example of a "membership card", as is a driver's license.

A membership card also identifies the holder as a member of the issuing organization, but this is primarily for use by other organizations, since in an electronic world an organization may be presumed to have an available database of members, making membership cards superfluous. As a real-world example, membership cards may be used across organizations, such as showing a specific airline's frequent-flyer card to receive a discount at a particular car-rental agency. The car-rental agency can't redeem miles, but can give a discount after seeing a valid card. Thus possession of the card has value, even if not as currency.

Membership cards are one application of a special property of Transactor objects: the assigned property. An assigned object is owned like any other Transactor object, but its ownership cannot be changed by the owner, only by the maker/issuer. Specifically, the assigned object cannot be sold or traded away until after it expires (thus not interfering with any potential collectibles market). If the issuer creates the object with an expiration date, then the object is only valid until that date.

All assigned objects contain the normal Transactor fields identifying the owner, maker, etc. But since these fields are inherently alterable, the assigned object must have an override mechanism. That override is contained in the digitally-signed and inherently unalterable body of the object. It consists of an additional packet of data labeled as "assignment data" and appearing in a standardized form, which contains the TID of the issuing organization, the TID of the assigned owner, and an assignment expiration date. These unalterable fields automatically override the normal Transactor fields, and thus prevent the object from being traded away or transferred. Since the issuer and assignee TID's are visible, the user's membership in that particular issuing organization is confirmed to any third party who requests a membership card.

The assignment data packet may also hold an expiration date. When used beyond that date, the object is no longer valid, and should be treated as if the object did not exist. For the case of membership cards, this represents the membership expiration date. For other kinds of assigned objects, it may represent a deadline or some other fixed date or timestamp, as defined by that kind of object's unique requirements.

Membership cards may be defined by the issuer/maker to hold preferences or other demographic data about the assigned owner. This data may be encrypted, visible only to the issuer, or it may be cleartext, visible to any organization that the card is presented to. In the real world, for example, driver's licenses are effectively membership cards. A "motorcycle" endorsement or "corrective lenses" restriction are owner-specific information encoded on the card itself.

3. Private Currencies

A private currency is any fungible valuable medium of exchange that does not represent actual money. The term fungible means that the nature of the object makes it replaceable and non-unique, such as grain or cash is in the real world. The term valuable simply means that people might have a reason to collect pieces of the exchange medium, other than as collector's items. So private currencies do have real value, even if not directly convertible to cash. Some real-world examples are frequent-flyer miles that accrue and earn airline tickets or hotel stays, or the "bonus points" awarded by some long-distance phone carriers that can be redeemed for phone-time or merchandise. But perhaps the best-known example is S&H green stamps—they are fungible and valuable, but have no actual cash value.

When a Transactor system is installed, its medium of exchange is defined as either money or a private currency. If the private currency option is chosen, then a CurrencyConversion supporting module is configured and installed in the system. This module converts private currency amounts into money amounts, as needed by other modules in the system (e.g. the billing department). The actual conversion data is defined in a vendor-specific database, which is kept secure on the vendor's servers, and can be edited by the vendor at any time.

A private-currency Transactor system requires conversion into and out of the private currency. Conversion into private currency is made as a money-purchase of some number of units of the private currency. For example, a user spends $10 and has 1000 quatloos credited to his account. This can be a straight linear conversion, or it can be tiered (e.g. spend $20 and get 2500 quatloos), all as defined in the conversion database.

Normal spending of the private currency is simply a "redemption" of the private currency in exchange for an object. This needs no conversion, only the price of the object expressed in the private currency, e.g. 200 quatloos to purchase a new laser-pistol digital object. The buyer's account is debited and the object is transferred to the new owner. If the seller were another user, then the seller's account would be credited. Nowhere is a conversion out of the private currency required. Note that this is true even when physical objects are being purchased (e.g. the example of S&H green stamps did not require cash, either).

Conversions out of the private currency only occur when outside organizations are involved. For example, if a phone company were offering conversion of quatloos at 50 per minute of long-distance time, then a conversion would need to be performed. This information is contained in the database, and identifies not only the conversion rate, but the identity of the offerer (phone company), the expiration date of the offer, and any other limits on conversion (not more than 5000 quatloos per individual). All this data is used to perform an outside transaction, according to the protocols for physical objects (described next).

Purchasing Physical Objects

Physical objects can be bought and sold on a Transactor system, in addition to or as an alternative to purely digital objects. For example, a user can buy a T-shirt or a game accessory as easily as a new digital game object. The user immediately receives an assigned digital object representing the purchase of the physical object, and later receives the actual physical object via a shipping channel. Any conventional shipping channel may be used for this purpose.

The purchase of physical objects requires an interface between the Transactor server and a merchandise supplier. This is similar in concept to the interface between the Transactor server and financial institutions, and is accomplished using identical supporting software and interfaces; that is, the merchandise supplier appears to the system as just another outside organization providing "financial" services. The only difference is that the middleware deals in merchandise orders rather than in monetary transfers. Both types of transactions involve transfer of value, account reconciling, security aspects, etc.

When a user purchases a physical object, his account is debited in the normal way. A new digital object is created and transferred to the user. This digital object represents the merchandise order, and contains all the information one would find on a regular order receipt: date of order, price, tracking number, buyer, seller, shipper, shipping address, etc. Thus, the digital object serves as a digital receipt. The digital object, however, can also contain other elements, such as beauty shots of the purchased physical object (e.g. JPEG images), preferably rendered to match any optional features, like color or size. This digital object is an assigned object having no intrinsic value (described above, under "Membership Cards"). Since it is assigned only to the buyer, it cannot be traded away, although it can be deleted from the owner's inventory at any time, if desired.

When the user's account is debited, an order is placed with the merchandise supplier, as if that supplier were being "credited" with the amount deducted from the user. In reality, the "credit transaction" is an order for the merchandise, incorporating all the shipping information and other account information needed to process the order. At that point, it is the supplier's responsibility to ship the order to the user, and the Transactor system is not involved any further.

This protocol for purchasing physical objects works for any Transactor-supported sales mechanism, including direct object sales as well as flyers. The flyer for a physical object is no different than that for a digital object, since both actually refer to a service provided by a supplier, as outlined above.

Cryptographic Protocols

A variety of cryptographic protocols to provide security for the above-described Transactor system and other Transactor systems according: to the present invention will be apparent to those skilled in the art based on the present disclosure. This section presents a preferred set of mechanisms and protocols used to provide security in connection with the Transactor system discussed above. These security features are discussed in the context of, and are particularly useful in embodiments, involving interactive games which may allow ownership and transfer of various kinds of objects, both online and offline.

In the game setting, objects are typically owned by players (in some cases, they may be simply lying discarded somewhere, owned by no player, in which case ownership may be assigned to the game server). An object is not necessarily represented by an "object" in some programming language (though this would be a natural way to represent it). Game objects are usually owned by someone, and have specific attributes, which may change over time.

In some game embodiments, objects are owned by independent agents acting in the game world. This can be considered to be a form of ownership by the game server. In the worldview of the players, however, the objects will be owned by another entity.

Objects and Cheating

It is desirable to resist several kinds of cheating, which include:

a. Unauthorized creation—Most objects cannot be created by players.

b. Unauthorized transfer—Some objects can only be transferred under special conditions.

c. Unauthorized destruction—Most objects cannot be destroyed by players, or can only be destroyed under special conditions.

d. Impermissible multiple transfers—A player may try to transfer the same object sequentially to many other players, which is inappropriate for most objects as a previously transferred object is no longer in the first player's possession.

e. Queries—A player may try to determine what objects are in the possession of other players, or those objects' attributes.

f. Unwanted Transfer—A player may try to transfer an object to or from another player, without that player's approval.

g. Resurrection—A player may try to bring back an object that has been destroyed.

h. Alteration—A player may try to alter the attributes of an object, i. e. increasing the number of charges some magic item has.

i. Multiple Play—A player may try to play in many different games (in any mode but Server-Mode), and use the same objects in each. This is an extension of the idea of multiple transfers.

The following protocols and data structures allow the Transactor system to resist unauthorized creation, queries, and unwanted transfers at all times. All the other attacks can be resisted in real-time only in Server-Mode, and otherwise will allow the cheating to be caught later.

Notation

In this section, several protocols are described using the following simple notation:

a. Encryption using a symmetric algorithm, such as DES, 3DES, or RC4, is shown as $E\_\{Key\}(Data)$, where Key is the key and Data is the data being encrypted.

b. Hashing using a one-way hash function, such as MD5 or SHA1, is shown as hash(Data).

c. Public-key signing using an algorithm such as RSA, DSA, or El Gamal, is shown as $Sign\_\{PrivateKey\}(Data)$, where PrivateKey is the signer's private key, and Data is the data being signed.

d. Public-key encryption, using an algorithm such as RSA or ElGamal, is shown as
$PKE\_\{PublicKey\}(Data)$, where PublicKey is the public key of the message's intended recipient, and Data is the data being encrypted. Typically, this is used only to send random encryption keys for symmetric algorithms.

e. All protocol steps start with a header value, labeled something like:
U1=hash("Transactor System-Exit Visa Request").
This is used to ensure that both the sender and the receiver always can immediately tell which message of which protocol they have received. These can be precomputed and stored in the source code as constants, or the actual text string can be used to calculate this at run time.

f. Many protocols require some random numbers or keys. These are assumed to be coming from a high-quality cryptographic random bit generator. Good cryptographic libraries, such as BSAFE, RSAREF, and CryptoLib, have good software routines for starting with a random seed value too unpredictable to be guessed, and using it to derive a long sequence of unpredictable values. Typically, the problem is in getting a sufficiently random initial seed. Methods to do this are described in the last part of this section. A variety of protocols and algorithms are known to those skilled in the art (see, Scheier, *Applied Cryptography*, 2nd Edition (John Wiley & Sons, 1996)) and, based on the present disclosure, may be used in connection with embodiments of the present invention.

Implementation of the Protocols

Each protocol message has a unique 160-bit identifier at its beginning, followed by a 32-bit version identifier, and a 32-bit value giving the length of the whole final message. This is intended to allow an implementation to parse each incoming message immediately.

Preferably, there is one universally-accepted message:
U0=hash("Transactor System-Error Message")
V0=version
L0=total message length
Ux=the header of the previous message C0=error code L0a=Length of freeform error recovery data (may be zero).

D0=freeform error recovery data

X0=U0, V0, L0, hash(prev message *), C0,L0a, D0

* When there is no previous message, this is an all-zero field.

The total message is:

M0=X0, Sign{SK__{Sender}}(X0).

As stated below, all lengths are given in bits (to accommodate odd lengths of key or data), but all fields are padded out with zeros to the next full byte boundary.

The above described bit fields are examples only. Other embodiments having different bit fields and protocol implementations will be apparent to those skilled in the art based on the present disclosure.

Programming Models

A variety of interactive game design approaches for use in connection with a Transactor system will be apparent to those skilled in the art based on the present disclosure. In some embodiments, there is one central server, which holds the "world," and with which all players' machines interact to learn about and influence their world. This is an inherently simple way of implementing a game. It suffers from the problems that it may be hard to find a trusted server machine which has the computational ability and bandwidth to and from each player's machine to do this effectively. Essentially, this is related to centrally maintaining one big database with various kinds of access restrictions. The security model described below is most effective in connection with this type of game setting.

Modes of Play

This security system relates to the following four basic modes of play:

(1) Server-Mode: The most secure design for all of the security issues is simply to have each player interacting constantly with the server. The server can always arbitrate in disputes.

(2) Proxy-Mode: Some other entity is acting as proxy for the server. This would typically be the case when a small group of users wanted to play a "local" game. The proxy will prevent unwarranted creation, destruction, and afteration of objects in the local game, and will try to guarantee that no cheating done in the local game (even involving all participants) can allow cheating in the global game. Note that in many circumstances, one player in a group might be trusted enough to be the proxy.

(3) Group-Mode: A small group of players is interacting without even a proxy server. In this case, the group themselves must probably take on the proxy server's tasks, probably by delegating one of their machines to server as the proxy server.

(4) Player-Mode: In Player Mode, there is a single player playing the game alone. His machine is effectively the proxy server.

In any of these modes, objects may be transferred around between players, and may also (in some cases) be discarded or picked up. It may make sense to have a user ID for a player called "nobody," and have this user ID possess things that have been discarded. There may be one such user ID used for each different game or "world" that's going on, i.e. each Proxy Server may have its own.

Server-Mode

In Server-Mode, security concerns almost disappear. Presenting users with signed versions of their ownership certificates is unimportant, as is verifying those signatures; instead, the server keeps track of everything. This mode needs only two protocols-the one for preparing to leave this mode for some other mode, and the one for coming back to this mode from some other mode. Here, we also discuss the format of object ownership documents and object transfer documents.

1. Ownership Documents

An ownership document is a signed document from the server, affirming that at some time, T, a given player was in possession of a given object, with a given set of attributes and conditions.

Thus, it is structured as:

| field name | |
|---|---|
| a. hash ("Transaction System-Ownership Document" | 160 |
| b. Version | 32 |
| c. Length of document | 32 |
| d. PlayerID | 64 |
| e. PlayerPublic Key | 1024–2048 |
| f. ObjectID | 64 |
| g. Object Data and Attributes | variable*,** |
| h. Attribute Transfer Condition | variable* |
| i. Time at which this document was made. | 32 |
| j. Time at which this document expires. | 32 |
| k. Signature on fields a . . . j. | 1024–2048 |

*Variable-length fields always start with a 32-bit length identifier. All lengths are given in bits, but all fields are continued out to the next full byte. If the length field is zero, then that's all the data in that field.
**Object Data and Attributes may change after this document is issued in some cases, i.e., a gun with a limited number of bullets. Implementations need to be flexible enough to allow this, while doing some object-type specific tests to ensure that (for example) the magic lamp hasn't wound up with more wishes than it started with.

A variety of different implementations and structures for ownership documents used in connection with embodiments of a Transactor system will be apparent to those skilled in the art based on the present disclosure.

2. Exit Protocol

The player wants to be able to play at some other mode. Therefore, he requests an "exit visa" from the central server, to allow him to take part in other games. This works as follows:

a. The Player forms

U0=hash("Transactor System-Exit Visa Request")

V0=version

L0=length of final message, including signature.

R0=a random number of 64 bits

X0=U0, V0, L0, R0 and sends to the Server

M0 L X0,Sign__{SK_P}(X0)

b. The Server forms

U1=hash("Transactor System-Challenge for Exit Visa Request")

V1=version

L1=length of final message, including signature.

R1=a random number of 64 bits

X1=U1, V1, L1, hash(M0), R1 and sends to the Player

M1=X1, Sign__{SK_S}(X1).

c. The Player forms

U2=hash("Transactor System-Response for Exit Visa Request")

V2=version

L2=length of whole final message, including signature.

X2=U2, V2, L2, hash(M1)
and sends to the Server
M2=X2, Sign_{SK_P}(X2).
d. The Server forms
U3=hash("Transactor System-Exit Visa Transmission")
U3a=hash("Transactor System-Exit Visa")
V3=version
L3=length of whole message, including signature.
L3a=length of whole ExitVisa, including signature.
SO[1 . . . n], where SO[i]=signed object ownership statement for object i, and n=the number of objects owned by the user.
TS=valid time span
C'=certificate of P's public key
R3=a random number of 64 bits
K3=a random encryption key
X3=U3a, V3, L3a,hash(M2),R3, CP,TS,SO[1 . . . n]
ExitVisa=X3, Sign_{SK_S}(X3)
and sends to the Player
M3=U3, V3, L3, PKE_{PK_P}(K3), E_{K3}(ExitVisa)
3. Entrance Protocol
a. The Player forms
U0=hash("Transactor System-Entrance Visa Request3
V0=version
L0=length of whole final message, including signature
R0=a random number of 64 bits
X0=U0, V0, L0, R0
and sends to the Server
M0=X0,Sign_{SK_P}(X0)
b. The Server forms
U1=hash("Transactor System-Entrance Visa Challenge")
V1=version
L1=length of whole final message, including signature.
R1=a random number of 64 bits
X1=U1, V1, L1, hash(M0), R1
and sends to the Player
M1=X1, Sign_{SK_S}(X1)
c. The Player forms
U2=hash("Transactor System-Entrance Visa Transmission")
U2a=hash("Transactor System-Entrance Visa")
V2=version
L2=length of whole signed and encrypted message
L2a=length of EntranceVisa
ProxyExitVisa=the exit visa from the proxy server or the central server.
(K2=a random encryption key
X2=U2a, V2, L2a, hash(M1),ProxyExitVisa
EntrancVisa=X2, Sign(X2)
and sends to the Server
M2=U2, V2, L2, PKE_{PK_S} (K2), E_{K2} (EntranceVisa)
d. After this message has been decrypted and verified, the Server checks to see if any of the changes are in contradiction with other things (restrictions on objects, existing ownership records, etc.). If not, then the Server forms:
U3=hash("Transactor System-Entrance Visa Acknowledgment")

V3=version
L3=final length of M3
MESSAGE=any message that needs to be sent to the Player (This could be encrypted if necessary).
X3=U3, V3, L3, hash(M2), MESSAGE
and sends back to the Player
M3=X3, Sign_{SK_S}(X3)
Proxy-Mode
Proxy-Mode is also relatively easy to secure. The Proxy takes on the tasks of the Server- so long as these are done honestly, the whole system should work almost exactly like Server-Mode. However, if the Proxy is dishonest, then its dishonesty (at least in changing around object ownerships) should be easily detected.
1. Transfer Documents in Proxy-Mode
In this mode, transfers without revealing objects' histories directly to the receiving users are allowed. This prevents our system revealing things which players might want to keep secret.
(For example, if Alice really hates Bob, she may not want to trade with Carol, if she knows that Carol is also trading with Bob. In the real world, objects usually don't know their previous owners.)
In Proxy-Mode, the Proxy Server issues transfer documents. These are of the following general format:
  a. hash("Transactor System-Transfer Document")
  b. Version
  c. Length of whole transfer document, including signature
  d. FromPlayerID—ID of the player from whom object was transferred.
  e. ToPlayerID—ID of the player to whom the object was transferred.
  f. Proxy Server ID and Certificate.
  g. ObjectID
  h. Object Data and Attributes
  i. Conditions on Transfers
  j. Time of Transfer
  k. Time this Document Expires
  i. AuditTrail, as discussed below.
  m. Sign_{SK_{ProxyServer}}(Fields a . . . l).
2. AuditTrails
Audit trails to ensure that the Server can untangle fraud or errors in object transfers can be implemented in this mode. An audit trail contains the previous transfer document, encrypted under the server's public key. This document will get larger for each transfer, which will leak information about this object's past. This limited information leakage does not present a problem, however, in many embodiments.
The structure of an AuditTrail is:
  a. U0=hash("Transactor System-AuditTrail (Proxy)")
  b. version
  c. length of whole AuditTrail.
  d. PKE_{PK_S}(K0), where K0 is a random encryption key.
  e. E_{K0}(Previous TransferDocument)
Note that if there is no previous transfer document, we simply set the length field here to 224, which makes it clear that there's nothing that follows this field.
3. Entrance Protocol
Entrance into the game being run by the proxy server occurs as follows:
  a. The Player forms
  U0=hash("Transactor System-Entry Request (Proxy)")

V0=version
L0=length of whole final message, including signature
R0=a random number of 64 bits
CP=certificate of player's public key, from ExitVisa.
X0=U0, V0, L0, R0, CP
and sends to the Proxy Server
M0=X0,Sign_{SK_P}(X0)

b. The Proxy Server verifies the certificate and signature, and then forms:

U1=hash("Transactor System-Entry Challenge (Proxy)")
=version
L1=length of whole final message, including signature.
R1=a random number of 64 bits
C_Q=certificate of the proxy server's public key, given by the central server.
X1=U1, V1, L1, hash(M0), R1, CS
and sends to the Player
M1=X1,Sign_{SK_Q}(X1).

c. The Player forms
U2=hash("Transactor System-Entry Response Envelope (Proxy)")
U2a=hash("Transactor System-Entry Response (Proxy)")
V2=version
L2=final length of M2
L2a=final length of Y2
K2=a random encryption key
R2=a random number of 64 bits
ExitVisa=the Exit Visa given by the central server earlier.
X2=U2a, V2, L2a, hash(M1), R2, ExitVisa
Y2=X2, Sign_{13} {SK_P}(X2)
and sends to the Proxy Server
M2=U2, V2, L2, PKE_{PK_Q}(K2), E_{K2}(Y2).

d. The Proxy Server forms
U3=hash("Transactor System-Entry Acceptance Envelope (Proxy)")
U3a=hash("Transactor System-Entry Acceptance (Proxy)")
V3=version
L3=final length ofM3
L3a=final length of Y3
PlayerData=Data needed by the player to join the game.
X3=U3a, V3, L3a, hash(M2), PlayerData
Y3=X3, Sign_{SK_Q}(X3)
K3=a random encryption key
and sends to the Player
M3=U3, V3, L3, PKE_{PK_P}(K3), E_{K3}(Y3).

e. The Proxy makes some kind of note to tell the central Server that the Player joined the game at this time. When this is delivered, the central Server is able to detect various kinds of cheating. To form this note (whose method of delivery is still unspecified), the Proxy forms:

U4=hash("Transactor System-Entry Acceptance Note (Proxy)3
V4=version
L4—final length of M4
IDP=ID of player
T=timestamp
X4=U4, V4, L4, ID_P, T,hash(ExitVisa)
and sends to the central Server
M4=X4, Sign_{SK_Q}(X4).

4. Exit Protocol

Exit from the game being run by the proxy server is relatively simple. The transfers have all been sent, and the Proxy Server knows enough to form the messages needed to convince the Server that things are on the level.

a. The Player forms
U0=hash("Transactor System-Exit Visa Request (Proxy)")
R0=a random number of 64 bits
V0=version
L0=final length of M0
X0=U0, V0, L0, R0
and sends to the Proxy
M0=X0, Sign_{SK_P}(X0).

b. The Proxy forms
U1=hash("Transactor System-Exit Visa Challenge (Proxy)")
R1=a random number of 64 bits
V1=version
L1=final length of M1
X1=U1, V1, L1, hash(M0),R1
and sends to the Player
M1=X1, Sign_{SK_Q}(X1).

c. The Player forms
U2=hash("Transactor System-Exit Visa Response (Proxy)q
V2=version
L2 final length of M2
X2=U2, V2, L2, hash(M1)
and sends to the Proxy
M2=X2, Sign_{SK_P}(X2).

d. The Proxy forms
U3=hash("Transactor System-Exit Visa Response Envelope (Proxy)")
U3a=hash("Transactor System-Exit Visa Response (Proxy)")
V3=version
L3=final length of M3
L3a=final length of Y3
T0[1 . . . n] transfer chains for all n objects the Player has transferred.
ExitVisa=the ExitVisa issued to this Player by the central Server.
X3=U3a, V3L3a, hash(M2), ExitVisa,T0[1 . . . n]
ProxyExitVisa=X3, Sign{SK_Q}(X3)
K3=a random encryption key
K4=a random encryption key
and sends to the Player
M3=U3, V3, L3, PKE_{PK_P}(K3), E_{K3}(ProxyExitVisa),
and sends to the central Server (possibly through a slower channel)
M3a=U3, V3, W, PKE_{PK_S}(K4), E_{K4}(ProxyExitVisa).

In step d, it is not a security problem if K3=K4-the protocol is specified this way to allow implementations where it would be harder to use the same key for both messages. Also note that if K3=K4, it is very important that proper padding schemes be used in some public key schemes, such as RSA, to avoid various kinds of problems.

5. Transfer of Object

Transference of an object during play is simple: In the following, Alice is the player that starts out owning the object, and Bob is the player that ends up owning the object.

a. Alice forms

U0=hash("Transactor System-Transfer Request Envelope (Proxy)")
U0a=hash("Transactor System-Transfer Request (Proxy)")
V0=version
L0=final length of M0 including encryption.
L0a=final length of Y0
IDB=Bob's ID
R0=a random number of 64 bits
ObjectDocument=the current object ownership document
X0=U0a, V0, L0a, R0, IDB, ObjectDocument
Y0=X0,Sign_{SK_A}(X0)
K0=a random encryption key
and sends to the Proxy
M0=U0, V0, L0, PKE_{PK_Q} (K0), E_{K0}(Y0).

b. The Proxy decrypts and verifies the message. If all is well, it forms:

U1=hash("Transactor System-Transfer Challenge 1 Envelope (Proxy)")
U1a=hash("Transactor System-Transfer Challenge 1 (Proxy)")
V1=version
L1=final length of M1
L1a=final length of Y1
R1=a random number of 64 bits
Description=A description of the requested transfer, including descriptions of the object and any changes or costs from the Proxy Server.
X1=U1a, V1, L1a, R1, Description
Y1=X1,Sign_{SK_Q}(X1)
k1=a random encryption key
and sends to Bob
M1=U1, V1, L1, PKE_{PK_B}(K1), E_{K1}(Y1).

c. Bob decrypts and verifies the message. If he doesn't want to allow the transfer, he can send any message that isn't the expected response, and the transfer will fail. If he does want to allow the transfer, then he forms"

U2=hash("Transactor System-Transfer Response 1 (Proxy)")
V2=version
L2=final length of M2
R2=a random number of 64 bits
X2=U2, V2, L2, hash(M1), R2
and sends to the Proxy Server
M2=X2, Sign_{SK_B}(X2).

d. The Proxy verifies this message. If all is well, then it next forms:

U3=hash("Transactor System-Transfer Challenge 2 (Proxy)")
L3=final length of M3
V3=version
R3=a random number of 64 bits
X3=U3, V3, L3, hash(M0), R3
and sends to Alice
M3=X3, Sign_{SK_Q}(X3).

e. Alice verifies this message. If all is well, she then forms:

U4=hash("Transactor System-Transfer Response 2 (Proxy)")
L4=final length of M4
V4=version
X4=U4, V4, L4, hash(M3)
and sends to the Proxy
M4=X4, Sign_{SK_A}(X4).

f. The Proxy verifies this message. If all is well, it then forms:

U5=hash("Transactor System-Transfer Notification Envelope (Proxy)")
U5a=hash("Transactor System-Transfer Notification (Proxy)")
V5=version
L5=final length of M5
L5a=final length of Y5
TransferDocument=a transfer document, as described above.
X5=U5a,V5, L5a, hash(M2),TransferDocument
Y5=X5, Sign_{SK_Q}(X5)
K5=a random encryption key
and sends to Bob
M5=U5, V5, L5, PKE_{PK_B} (K5), E_{K5}(Y5).

Group-Mode

In Group-Mode, a group of two or more players get together without a mutually trusted server. This makes the protocols much harder to make resistant to various kinds of cheating. The preferred solution is to designate one of the players' machines as the Proxy Server, and implement the proxy mode security system described above.

Player-Mode

In Player-Mode, the Player controls his own computer. There are many opportunities for cheating here, but none of them should involve transfer of objects between this Player and others.

A wide variety of error message formats in all these protocols will be apparent to those skilled in the art based on the present disclosure. A simple set of exemplary error codes are set forth below.

| Error Code | Meaning |
| --- | --- |
| 0x00000000 | No Error - Generally Not Used |
| 0x00000001 | Ownership document version invalid |
| 0x00000002 | Ownership document structure invalid |
| 0x00000003 | Ownership document signature invalid |
| 0x00000004 | Ownership document time range invalid |
| 0x00000005 | Ownership document length field invalid |
| 0x00000006 | Ownership document - miscellaneous error |
| 0x00000007 | Message length invalid |
| 0x00000008 | Message version invalid |
| 0x00000009 | Message signature invalid |
| 0x0000000a | Message hash chain invalid |
| 0x0000000b | Message header invalid |
| 0x0000000c | Message not decrypted successfully |
| 0x0000000d | Message format invalid |
| 0x0000000e | Message out of sequence |
| 0x0000000f | Message - miscellaneous error |
| 0x00000011 | Wrapped message length invalid |
| 0x00000012 | Wrapped message version invalid |
| 0x00000013 | Wrapped message signature invalid |
| 0x00000014 | Wrapped message hash chain invalid |
| 0x00000015 | Wrapped message header invalid |
| 0x00000016 | Wrapped message not decrypted successfully |

-continued

| Error Code | Meaning |
| --- | --- |
| 0x00000017 | Wrapped message format invalid |
| 0x00000018 | Wrapped message out of sequence |
| 0x00000019 | Wrapped message - -miscellaneous error |
| 0x0000001a | Certificate signature invalid |
| 0x0000001b | Certificate expired |
| 0x0000001c | Certificate format invalid |
| 0x0000001d | Certificate - miscellaneous error |
| 0x0000001e | Transfer Document version invalid |
| 0x0000001f | Transfer Document length invalid |
| 0x00000020 | Transfer Document ID invalid |
| 0x00000021 | Transfer Document Proxy Server ID invalid |
| 0x00000022 | Transfer Document Object ID invalid |
| 0x00000023 | Transfer Document Object Data/Attributes invalid |
| 0x00000024 | Transfer Document Conditions on Transfers invalid |
| 0x00000025 | Transfer Document Time of Transfer Invalid |
| 0x00000026 | Transfer Document Expired |
| 0x00000027 | Transfer Document Signature Invalid |
| 0x00000028 | Transfer Document - Miscellaneous Error |
| 0x00000029 | Player ID invalid |
| 0x0000002a | Object ID invalid |
| 0x0000002b | Miscellaneous error |
| 0x0000002c | Internal error |

Trusted Agent

The trusted agent server can be thought of as a third party that holds and manages the user's business affairs, such as a credit card, a product warranty, an insurance card, or any business contract. Users contact the server by way of a network access device, such as a browser on a personal computer, a browser on a network computer, a browser on a cell phone, or using a voice response unit on a telephone.

The trusted agent client is a small client program that augments the user's network access device to perform business transactions on behalf of the user. The user controls these transactions through the trusted agent server.

The Trusted Agent Service

The trusted agent service is the trusted agent client application which operates in conjunction with the trusted agent server. The trusted agent service in its first embodiment is a Internet-based mechanism that makes single-click buying available on any commercial Web site. This mechanism brings the speed and simplicity of credit card use in the real world to its users on the Internet. The secure nature, and bank and credit card company branding, provided by this mechanism projects the trust association necessary at the point-of-sale to address consumer fears about security. This mechanism is a browser-based service that requires no download or installation, and may always be made available to the consumer free of charge.

The trusted agent also provides consumers with access to personal and credit card information used during single-click transactions, smart receipts used for ongoing customer support, merchant and product preference settings, and direct response product offerings keyed to these preferences. Because this information is all stored on the trusted agent server (similar to popular Web portal personal preferences), it is available on any device connected to the Internet, from desktop to laptop, even to PDA.

The trusted agent service is implemented by accessing the trusted agent server. Typically, trusted agent servers are operated by banks, government agencies, credit card companies, and other contractually trustable trusted agent service providers.

Other Commerce Servers

The trusted agent server communicates with other commerce servers. Some of these servers are designed to work closely with the trusted agent server. In the preferred embodiment of the invention, two such commerce servers are the direct response server and relationship marketing servers. Merchants and banks use these servers to communicate to customers who have accounts on a trusted agent service. These products enable such merchants and banks to conduct ongoing business relationships with customers by sending and making use of information stored online in the consumers trusted agent.

The direct response server enables the creation, delivery, and single-click redemption of direct response offers from anywhere on the Internet. These offers can be delivered to trusted agents according to consumer preferences, or found in a banner-like format on Web sites. The direct response server can deliver online any one of at least three classic forms of traditional direct response.

First, they can handle a direct order by concluding a transaction for the product they represent without requiring a jump to any other site.

Second, they can generate a lead by transmitting a request to a merchant for additional information.

Third, they can generate store traffic, either through a link to redemption at an online commerce site, or by being printed on paper and taken for redemption to an actual retailer location.

The relationship marketing server uses smart receipts as the basis for after-market consumer care. When a consumer buys a product, the merchants relationship marketing server generates a unique digital object in the form of a smart receipt which contains all of the information needed for consumer care. The relationship marketing server sends this information to the customer's trusted agent. The customer can open his trusted agent using a URL, click on the smart receipt, and be presented with a number of services, such as automatically routed requests for customer service or return authorizations, 800 number listings to call for help, order status tracking (for example, offered in eventual partnership with such shipping companies as Federal Express or UPS), and pre-formatted and routed requests for related product offers.

Other commerce servers enable point-based loyalty programs and club cards for discounted purchases and volume purchase rewards.

Figure 10:
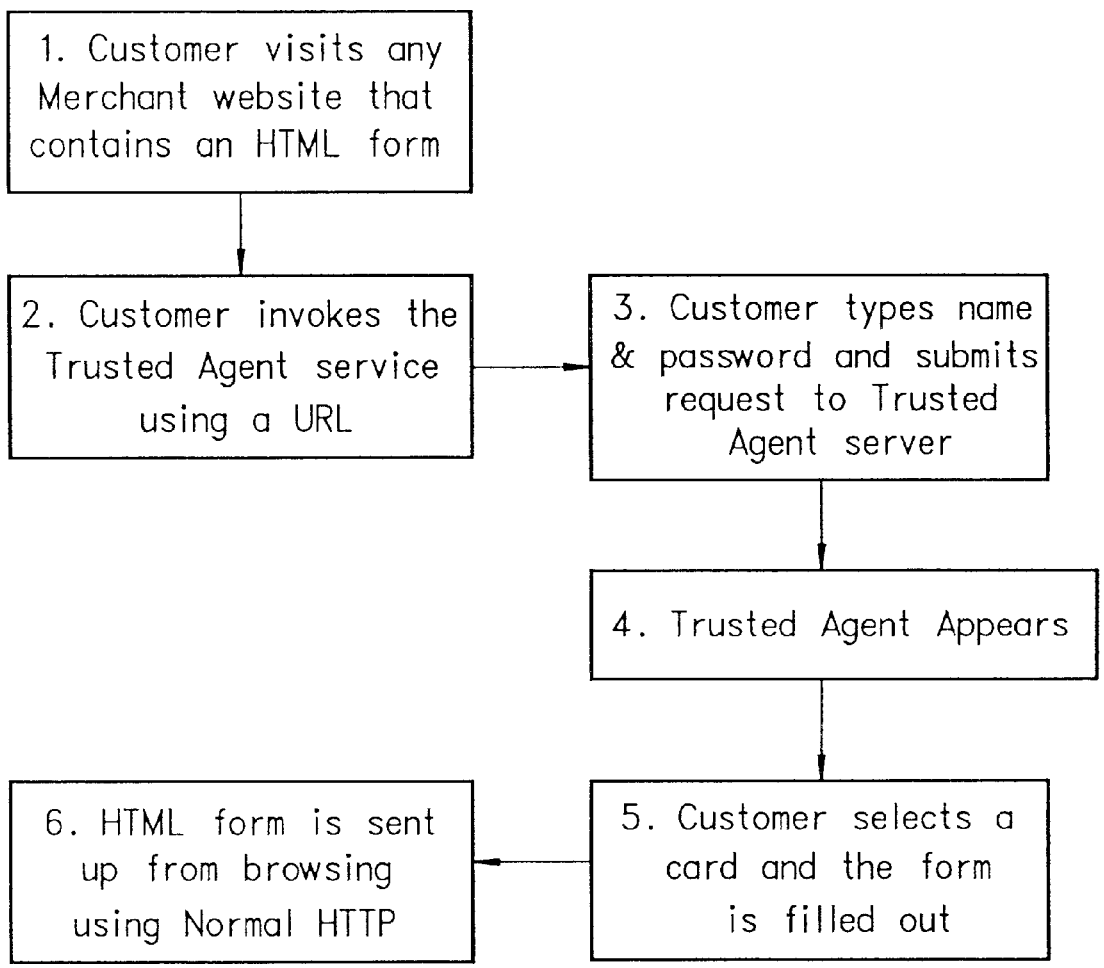
FIG. 10 is a flow diagram showing a trusted agent process according to the invention.

The trusted agent process is depicted in FIG. 10. In a typical transaction, a customer visits any merchant Web site that contains an HTML form (1). The customer invokes a trusted agent service provider service using a specific URL that links the customer to the trusted agent service provider's server (2). The customer types in his name and password, and the customer request is submitted to the trusted agent server (3). The trusted agent appears (4). The customer selects a card and the form is automatically filled out for the customer by the trusted agent (5). The HTML form is then sent to the merchant from the customer's browser using the standard HTTP transport protocol (6).

While the invention is described herein in connection with the HTML and HTTP protocols, it will be appreciated by those skilled in the art that other protocols may be used to implement the invention.

Entities and their Communication Techniques

Figure 11:
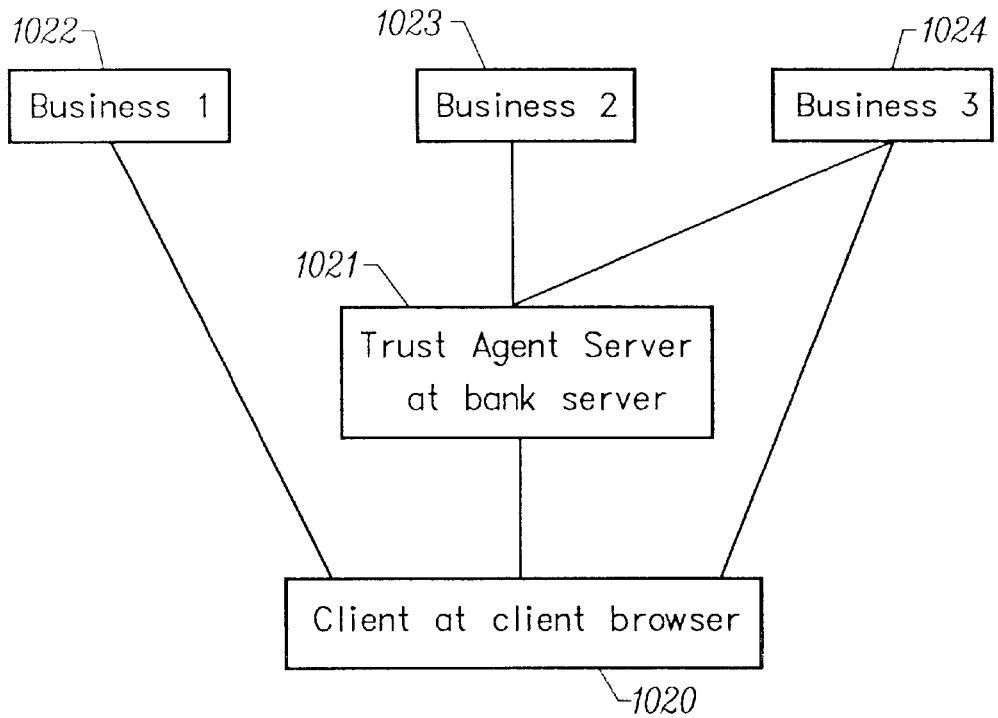
FIG. 11 is a block schematic diagram showing a customer in communication with both a trust agent server and various business according to the invention.

FIG. 11 is a block schematic diagram that depicts the trusted agent service provider client 1020 in communication with both the trusted agent server 1021 and various businesses 1022–1024. The trusted agent server performs certain actions on behalf of the client. These actions may be done using two techniques (discussed below), referred to herein as the indirect technique and the direct technique. This communication may be based on known Internet protocols, such as the World-Wide-Web consortium's HTRP protocol. However, those skilled in the art will appreciate that alternative protocols are possible.

There are three types of business that may be associated with the presently preferred embodiment of the invention:

Businesses of type 1 are legacy businesses that are not yet enabled with the more modern direct techniques. Therefore, type 1 businesses use the indirect technique exclusively.

Businesses of type 2 only use the direct techniques.

Businesses of type 3 can use both the direct and indirect techniques.

The Indirect Technique

Figure 12:
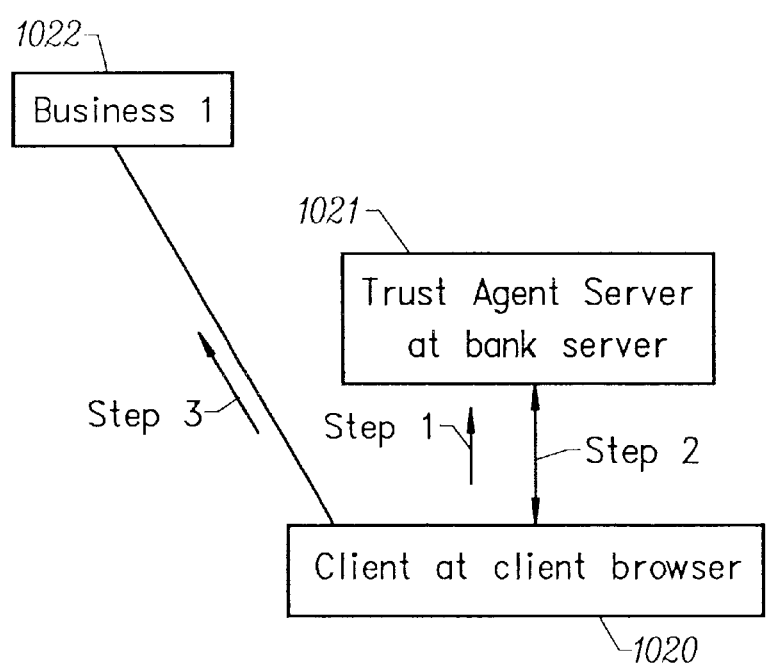
FIG. 12 is a block schematic diagram that depicts the indirect technique according to the invention.

The indirect technique communicates command operations from the trusted agent server first to the user's browser and then to a business. FIG. 12 is a block schematic diagram that depicts the indirect technique. The process flow applied by the indirect technique is as follows:

The customer (client) invokes the trusted agent service.

Interaction between the client and the trusted agent server.

The client submits Web page to business.

The Direct Technique

Figure 13:
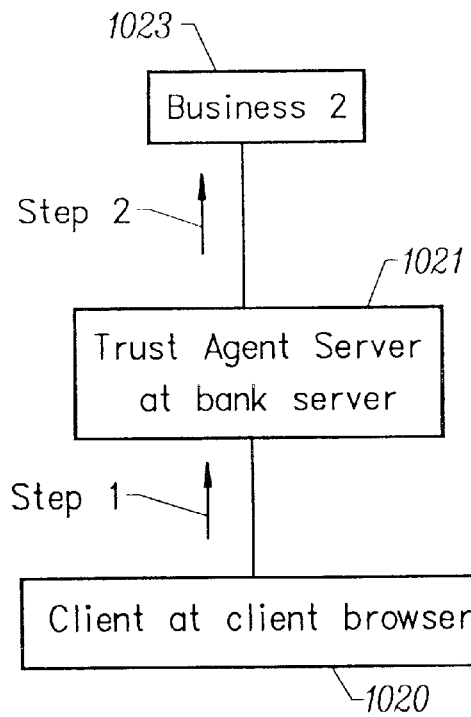
FIG. 13 is a block schematic diagram that depicts the direct techniques according to the invention.

The direct technique communicates operations directly from the trusted agent server to the business. FIG. 13 is a block schematic diagram that depicts the direct technique. In the preferred embodiment of the invention, the trusted agent server communicates to the business server either using HTML or using the technology of Transactor Networks Inc. of San Francisco, California referred to as the Limited Edition Digital Object (LEDO) system. Those skilled in the art will appreciate that other protocols are possible.

Business Instruments and their Embodiments

The customer understands that what they are manipulating is a familiar business instrument such as a credit card, a receipt, a coupon, a warranty, a contractual offer, a medical insurance card, or other well known commercial construct. It is simple to use a credit card number to charge goods and services to a credit card account without using the actual plastic card provided by the bank. The following definitions are applied to the different embodiments of these business instruments:

Business Document: the entity as it is embodied on paper or plastic.

Business Affair: the entity embodied in legal and business terms.

Business Object: the entity embodied in a computer.

Business Instrument: the entity overall.

Each business instrument can be represented in several ways. In the preferred embodiment of the invention, a business object is stored as a LEDO. Those skilled in the art will appreciate that other implementations are possible, e.g. the business affair may be stored as a record in a database. A LEDO is a network digital object that has ownership that can be verified over a network. LEDOs provide efficient techniques to implement many of the legal and business issues of the instrument's business affairs. However, other, less efficient techniques may be applied to manage the instrument's business affairs.

Figure 14:
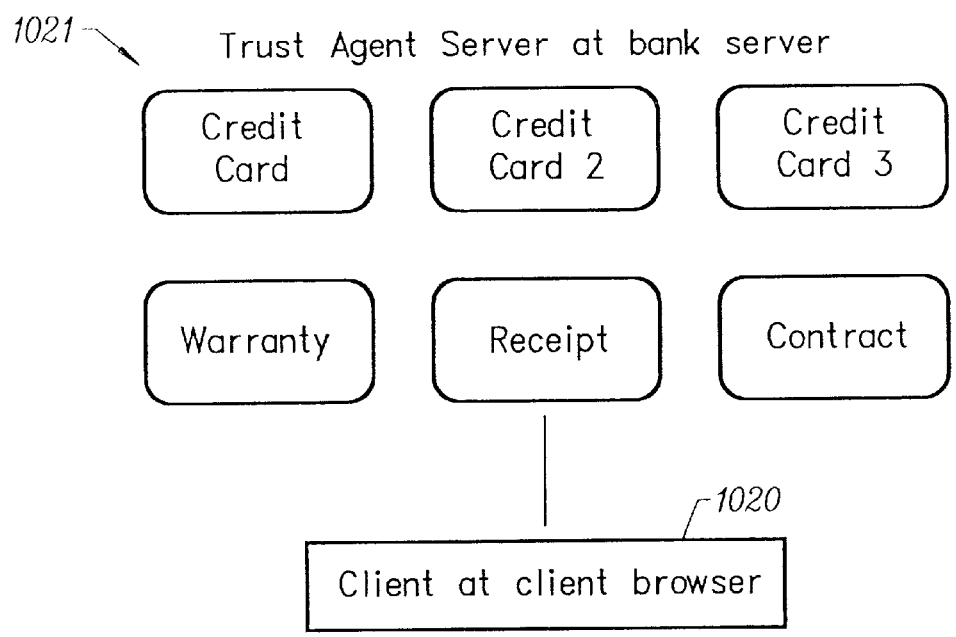
FIG. 14 is a block schematic diagram that depicts the trusted agent storing business objects on behalf of the customer according to the invention.

In the preferred embodiment of the invention, the business affairs are represented as LEDOs that are stored at the trusted agent server. FIG. 14 is a block schematic diagram that depicts the trusted agent storing business objects on behalf of the client.

Customer creation of the Trusted Agent Service

Figure 15:
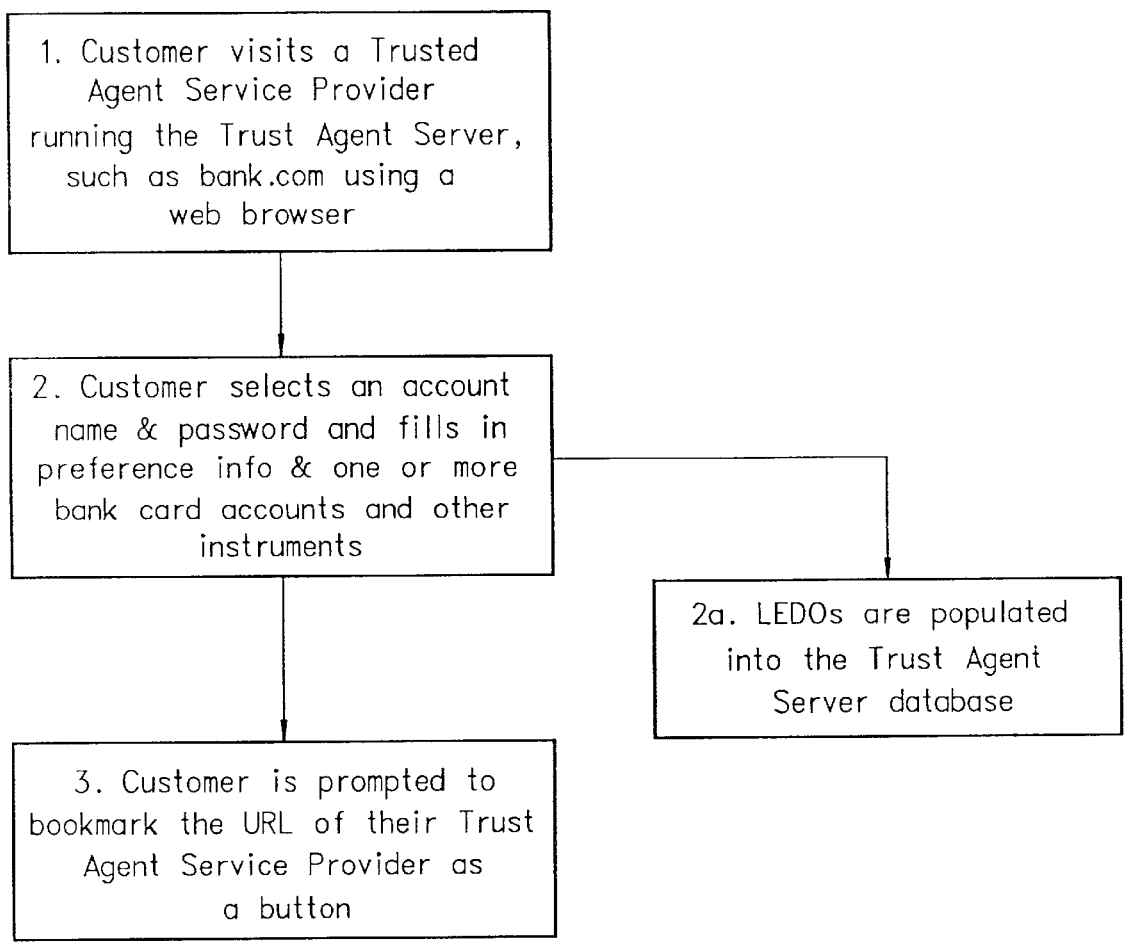
FIG. 15 is a block schematic diagram that depicts the customer sign up process according to the invention.

Customers sign up for the trusted agent service by visiting a trusted agent service provider Web site. FIG. 15 is a block schematic diagram that depicts the customer sign up process. The customer first visits a trusted agent service provider that is running the trust agent server, for example a bank, using the customer's Web browser (1). The customer selects an account name and password and fills in preference information, as well as one or more bank card accounts, and other instruments (2). In the presently preferred embodiment of the invention, LEDOs are populated into the trust agent server database (2a). The customer is then prompted to bookmark the URL of their trust account service provider as a browser button (3).

Customer Use of the Trusted Agent, Indirect Technique

As described earlier, a customer can use their trusted agent service on any merchant Web site that is HTML compliant. The process requires an exchange between the customer browser, the merchant's Web server, and the trusted agent's Web server. FIG. 16 is a flow diagram that depicts the use of the trusted agent by a customer during a commercial transaction with a merchant.

To use the trusted agent, the customer first browses the Web until he finds a merchant Web site that provides goods and/or services of interest to him (1). The merchant server begins a session with the customer's client (2). Pursuant to the session, the merchant's server downloads a page to the customer (3). The page presumably includes an HTML form that requests various information from the customer as part of an on-line commercial transaction. The user invokes the trusted agent service by accessing a URL associated with the trusted agent service (4). The trusted agent server downloads the trusted agent program to the customer (5). The trusted agent then inspects the merchant's Web page which is displayed in the customer's browser (6). To use the trusted agent, the customer types in their trusted agent user name and password (7). The customer then submits the Web page to the trusted agent server (8). The customer's name and password, as well as the merchant page, is uploaded to the trusted agent server (9). The trusted agent server then analyzes the page (10). Thereafter, a new trusted agent program is generated by the trusted agent server (11). The generated trusted agent program received by the client instruments the merchant Web page (12). The customer sees a set of operations, such as credit card selection or address book selection, occur in their trusted agent (13). The customer selects the desired operation from the trusted agent page (14) and the trusted agent fills out the Web page (15). The Web page is now complete and the user can submit same to the merchant (16) who can then process the page as usual, unaware of the assistance provided to the customer by the trusted agent (17).

Creating a Trusted Agent

The trusted agent is a small program that is written in a portable language, such as JavaScript, Java, C, C++, Visual Basic, Dynamic HTML program, or any other similar language. These programs are trusted because they are digitally signed by an authority that the end user trusts.

Figure 17:
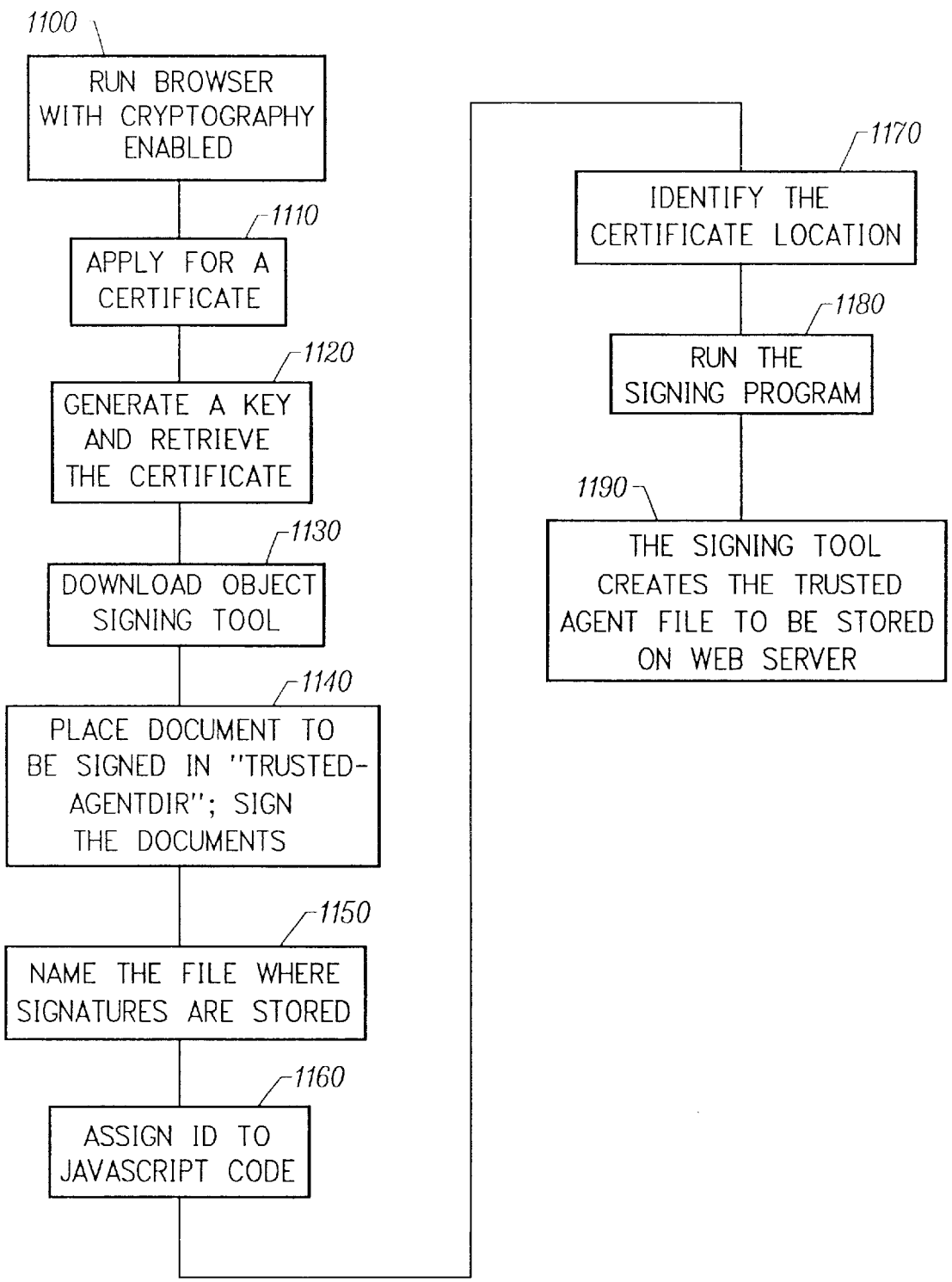
FIG. 17 is a flow diagram showing the creation of a trusted agent according to the invention.

The following discussion explains the presently preferred method of creating a trusted agent using JavaScript in the popular Netscape Navigator browser application (see FIG. 17). Those skilled in the art will appreciate that substantially similar forms can be implemented using Microsoft's Internet Explorer or any other browser.

To create and run signed JavaScript under Netscape Navigator, the developer must have be in possession of the private key and a certificate issued to an authority that the consumer is willing to trust, such as Verisign (verisign.com).

Run a Navigator 4.05 or higher browser with 128-bit cryptography enabled (1100). The browser may be downloaded from www.netscape.com by filling in a form with the user name and address and stating that the user is a U.S. national (U.S. government export controls apply to this level of cryptography). The standard export-approved browser has only 40 bit bulk encryption and 512 bit RSA, accordingly such certificate provides much less security. The actual level of cryptography obtained is a matter of choice.

Apply for a class 2 or 3 code signing certificate by using the above-mentioned browser to visit http://digitalid.verisign.com, clicking on "Developers," and following the instructions for getting a Netscape object-signing certificate (1110). Class 2 certificates are for individuals, cost $20.00, and take a few minutes to obtain. Class 3 certificates are for companies, cost $400.00, and take longer (it is necessary to fax the company's incorporation papers and other documents to Verisign). It is necessary to provide personal information similar to a credit card application (e.g. social security number, current and previous addresses) to obtain a class 2 certificate. Getting the class 2 certificate involves obtaining a hexadecimal access code by email and pasting it back into Verisign's Web page. Instructions are provided on the page provided by Verisign.

Follow the instructions for generating a key in the browser and retrieving the certificate (1120). The browser creates a key pair and uploads the public component to Verisign through a secure socket layer (SSL) channel. Verisign signs the public key and returns the certificate, and Navigator stores the key components and certificates in the \Program Files\Netscape\Users directory. As a result, there is a secret key on the Windows 95 (or Macintosh) hard disk. The certificate has an identifying string, such as "Theodore C Goldstein's Verisign Trust network ID," which is used by the signing tool (and other programs) to locate the certificate after Navigator installs the certificate in its database (along with whatever other certificates it has). Note this string is independent of the user name, which appears in the signed portion of the certificate and cannot be changed. Similarly, Navigator prompts the user for a password to access the secret key once it is in the database.

- Download Netscape's object signing tool (1130) from http://developer.netscape.com/software/signedobj/jarpack.html#signtool1.1 and install the tool. This program has a Windows 95-friendly interface, which means it can be run from a command line in a DOS box as if it were a Unix program.
- Put the html files and JavaScript files that are to be signed in a directory (1140), which may be called, for example, "TrustedAgentDir." Next, run the signing tool. The signing tool searches the TrustedAgentDir directory for JavaScript components. It signs each piece separately and stores the signatures in a jar file, which is similar to a zip file
- Select the name of the jar file where the signatures are stored, e.g. "TrustedAgent.jar". Every file containing JavaScript that must be signed must have a SCRIPT tag with the ARCHIVE attribute specifying the name of the jar file, e.g.:

<SCRIPT ARCHIVE="TrustedAgent.jar" ID="a" >
  [JavaScript code]
  </SCRIPT>
  More information on this step of the process is available at:
  http://developer.netscape.com/docs/manuals/communicator/jsguide4/sec.htm
- Every piece of JavaScript code must have a unique ID attribute (1160). The ID is a label that the browser uses to find the signature for that particular piece of code. For the above piece of code, the ID is "a." Somewhere further down in the file, there a button may be provided that runs other code when the button is clicked. That other code must also have its own signature. Accordingly, the other code needs its own unique ID tag:

<INPUT TYPE="button" NAME="check" VALUE="Click and Buy" onClick="JavaScript:updateOpener()" ID="b">
  Here, the tag "b" is assigned to the (small) piece of code "updateOpener()" that is run when the button is clicked. Each piece of code must be signed because one is not allowed to run signed code from unsigned code.
- Find the certificate location (1170) by using Windows Explorer's "find file" command to locate a file called "cert7.db". This file should be in a directory, such as c:\program files\netscape\users\tedg. It is necessary to supply this directory name to the signing tool in the next step.
- Use a command to run the signing program (1180), such as:

signtool –d "C:\program files\netscape\users\tedg"
  –k "Theodore C Goldstein's Verisign Trust Network ID"
  –J TrustedAgentDir
  where the above command line arguments are all on one line. This command may be saved in a .bat file, if it is necessary to run it often. The –J argument indicates the name of a directory that contains JavaScript code. The –d argument indicates where the private key and certificate are located. The user is prompted for the pass phrase as part of this operation.
- The signing tool creates an TrustedAgent.jar file (1190) which must be stored on the Web server along with the user scripts.

Alternative Embodiment of the Invention

Figure 18:
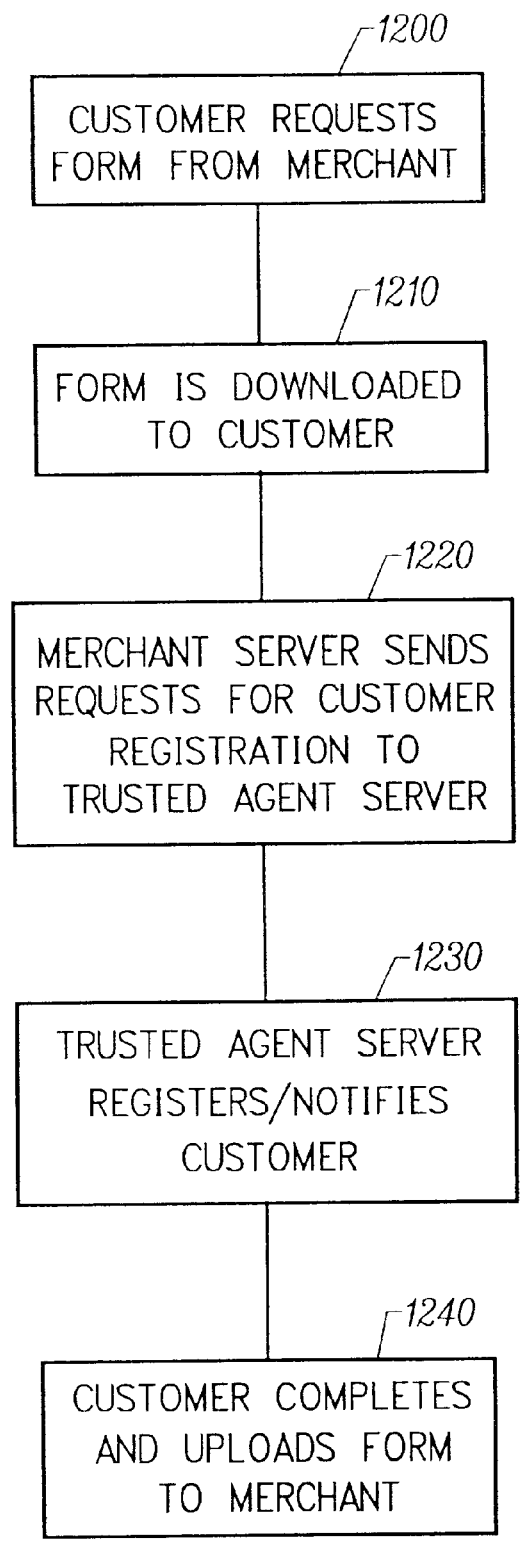
FIG. 18 is a flow diagram showing merchant initiated user trusted service registration according to the invention.

The embodiment of the invention provides merchant initiated user trusted service registration (see FIG. 18).

- The customer requests a form from merchant Web site (1200).
- The form is downloaded from merchant Web site to the customer (1210). The form includes a button that the customer can click to request registration with trusted agent service.
- The merchant server sends a request for customer registration to the trusted agent server (1220).
- The trusted agent server registers and notifies the customer (1230).
- The customer completes the form and uploads it to the merchant (1240).

Smart Receipts

A preferred embodiment of the invention provides intelligent receipts, called Smart Receipts, that electronically document a transaction between two parties. Smart Receipts maintain a persistent connection between two parties following a successful online transaction.

A Smart Receipt is delivered over a secure connection from the merchant to a Trusted Agent Server, where it is stored and is made available to the customer. The Smart Receipt provides the customer with detailed information about an online purchase in a standardized format. Hyperlinks embedded in the Smart Receipt enable the customer to access customer service and order status. The merchant may also embed additional services within the Smart Receipt, including special offers for future purchases.

The invention does not require a new and independent trust system. It uses existing Secure Socket layer (SSL) certificates for secure identification.

Figure 19:
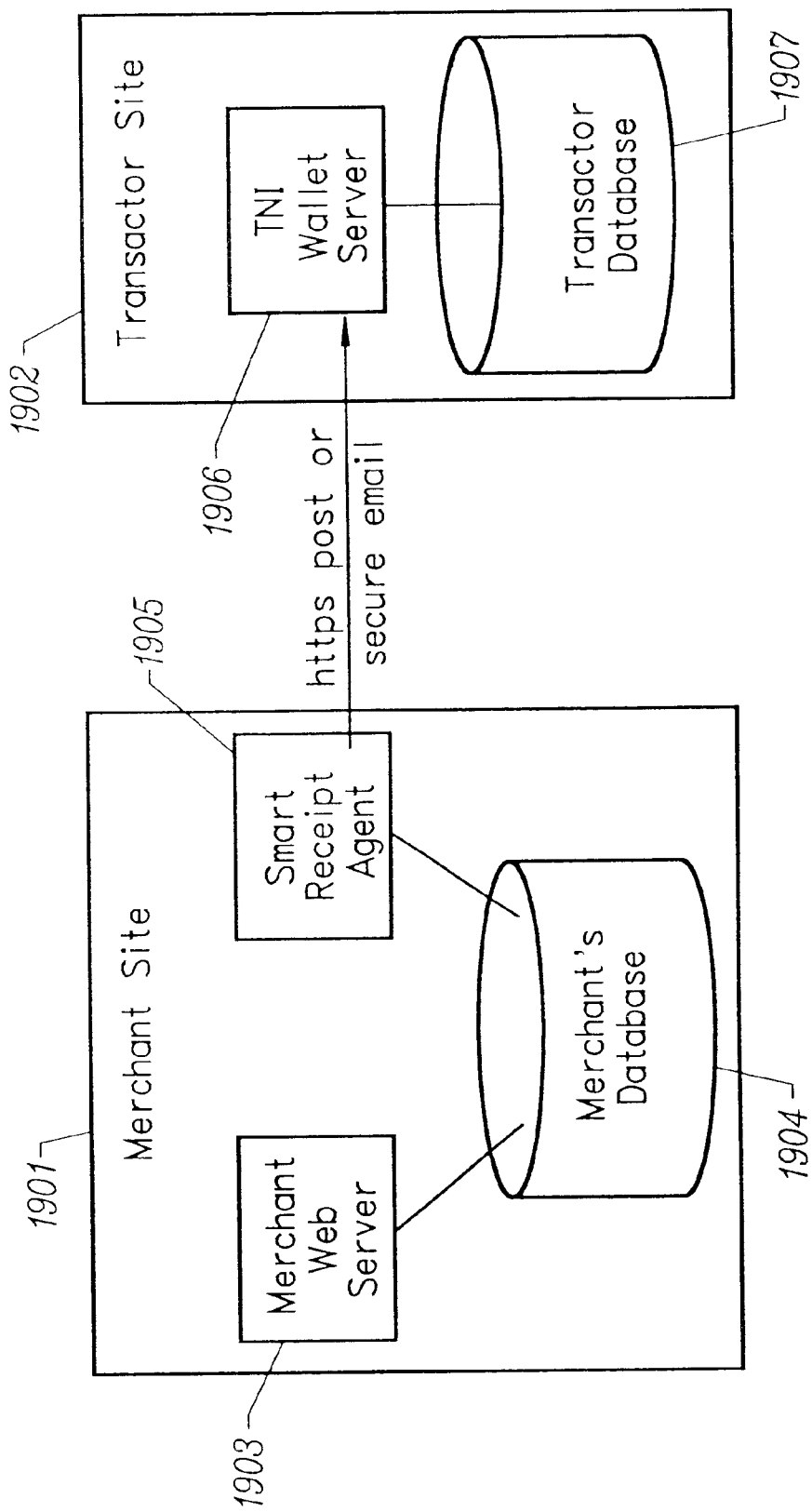
FIG. 19 is a block schematic diagram that depicts a merchant site communicating with a trusted agent server according to the invention.

Referring to FIG. 19, the invention provides an entity to entity communications path. Here, the communications path is between the Merchant's site 1901 and the Transactor site 1902. The Merchant Web Server 1903 accepts orders and records the transaction on the Merchant's Database 1904.

The invention enables a merchant to generate a Smart Receipt at the conclusion of a successful transaction. A Receipt Generation package (Smart Receipt Agent) 1905 is installed on the merchants server. Once the merchant's server is satisfied that the transaction is complete, the Smart Receipt Agent 1905 retrieves from the Merchant's Database 1904 the representation of the purchase. The Smart Receipt Agent 1905 creates an XML representation of the purchase that is consistent with Transactor Networks Inc.'s Smart Receipt Document Type Description (DTD).

The XML representation of the Smart Receipt is transmitted over a secure connection to the Trusted Agent Server 1906. The invention offers multiple options for transport, including Email and SSL. Authentication that uses SSL should use SSL certificates. The identity of the certificates are recorded on the Trusted Agent Database 1907. Email transport is also secure.

The Smart Receipt is stored on the secure Trusted Agent Database 1907 located on the Transactor site 1902. The Smart Receipt is transported and stored in a LEDO in XML format. Information about the purchase is parsed out and stored as well.

The Smart Receipts are available to the user for sorting and browsing using Transactor Networks' Trusted Agent.

Figure 20:
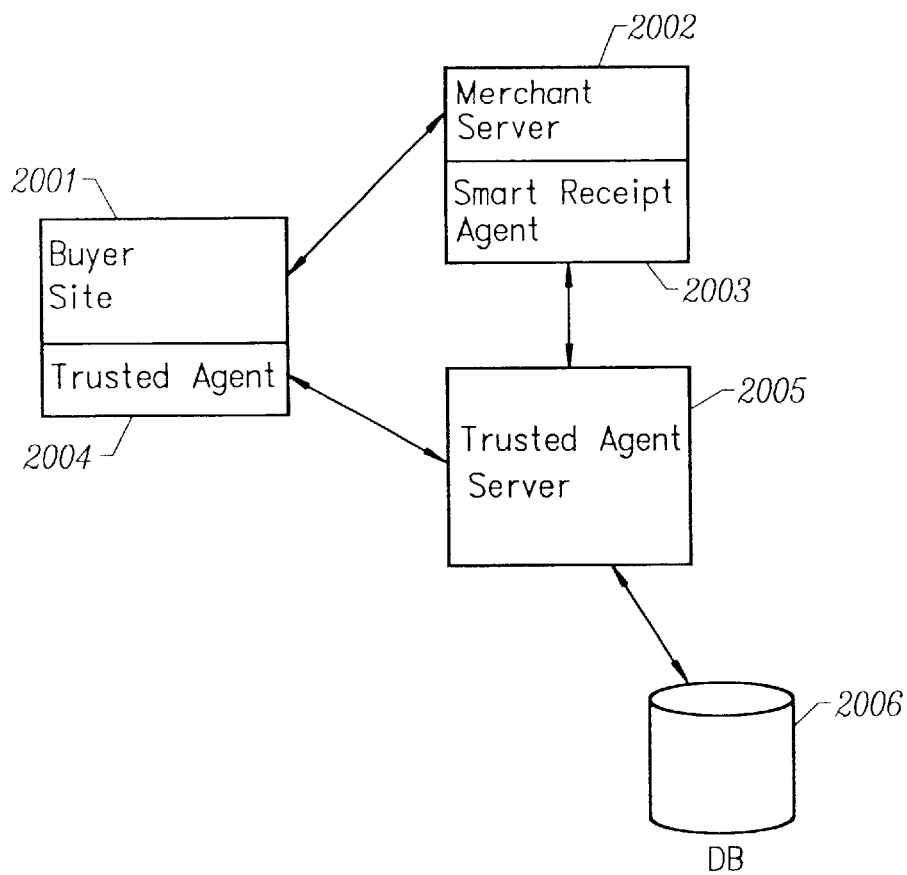
FIG. 20 is a block schematic diagram of a buyer/merchant transaction with a trusted agent server hosting the'smart receipt according to the invention.

With respect to FIG. 20, a typical transaction scenario is depicted. The Trusted Agent 2004 observes that the Buyer 2001 is attempting a transaction. The Trusted Agent 2004 creates an order record containing:

Shipping address

Billing Address

Purchase instrument—credit card#, type, expiration date

Merchant

Key—unique hidden field (LEDO)

The user can also add personal notes so he can easily identify the purchase. The Trusted Agent 2004 fills in the merchants order forms using the order record information. The order record is sent to the Trusted Agent Server 2005 and is stored in the Trusted Agent Database 2006. Once the transaction is completed, the Smart Receipt Agent 2003 located on the merchants site 2002 creates a smart receipt and sends the XML representation to the Trusted Agent Server 2005. The Smart Receipt object that is created contains:

Merchant verification of transaction with Key (LEDO)

Detailed list of items purchased

Description of items

Discounts—if applicable

Shipping address

The Trusted Agent Server 2005 receives the Smart Receipt and validates the receipt using the merchant's SSL. It then compares the order record LEDOs in the Database 2006 with the Smart Receipt LEDO to find the matching record pair. The records are persistent because there must be a matching pair to complete the transaction. The Trusted Agent Server 2005 verifies the following information with the order record:

1. Domain name—must match the merchant's
2. SSL ID—contained in merchant's SSL client
3. LEDO Key—unique key provides a shared secret—always required The Smart Receipt is made available to the Buyer through the Trusted Agent. The Smart Receipt is a dynamic entity; it is continuously updated until the Buyer deletes it from the Trusted Agent Server. The Buyer can, at any time, examine the Smart Receipt, check for warranty information, product updates, merchant specials, manufacturer discounts, or answer feedback questions.

Figure 21:
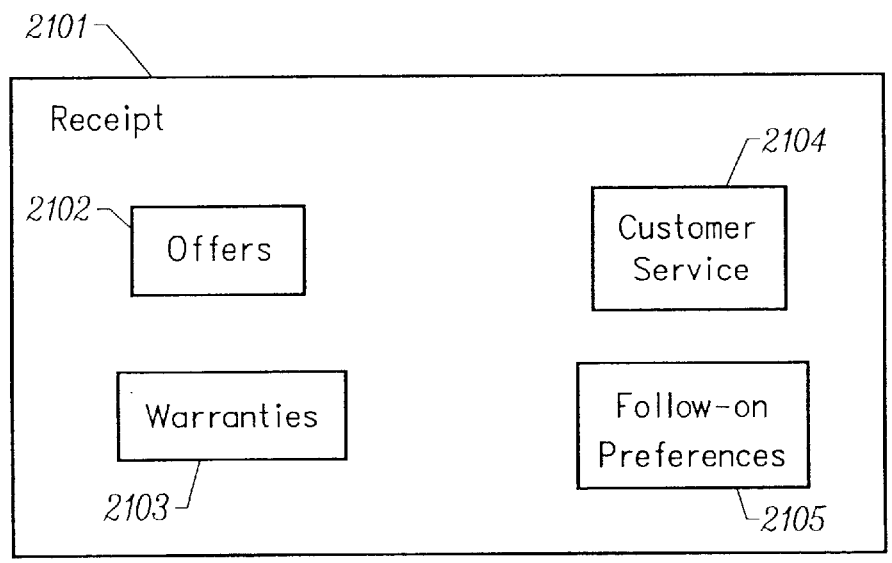
FIG. 21 is a block schematic diagram of an exemplary smart receipt according to the invention.

Referring to FIG. 21, the Smart Receipt 2101 can contain: offers 2102; warranties 2103; customer service information 2104; and follow-on preference choices 2105.

A conventional receipt offers: 1) customer service; non-repudiation from the merchant; and 3) customer record keeping. The Smart Receipt offers the following advantages above and beyond the conventional receipt: 1) uniquely identifies the transaction; and 2) allows valve-added services to be offered to the customer.

Figure 22:
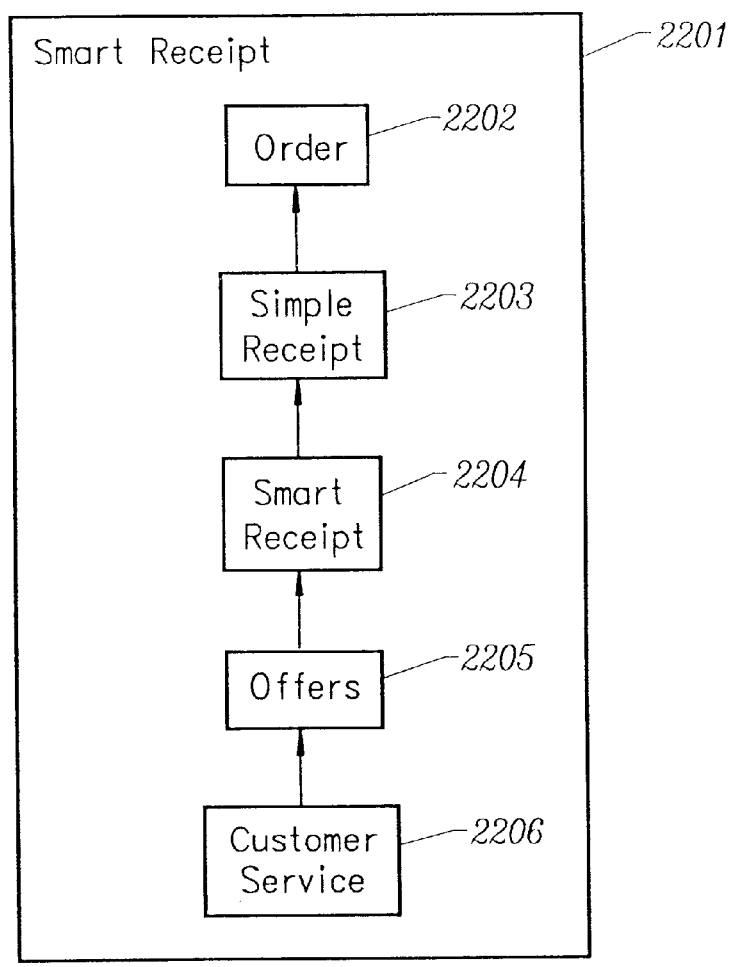
FIG. 22 is a block schematic diagram of a Limited Edition Digital Object (LEDO) chain in a smart receipt according to the invention.

With respect to FIG. 22, the Smart Receipt 2201 is comprised of a collection of LEDO objects. Each LEDO object has a unique owner. Multiple owners exist within a chain of LEDO objects. Here, the Smart Receipt 2201 comprises: an order object 2202 owned by the Buyer; a simple receipt object 2203 owned by the merchant; a Smart Receipt object 2204 owned by the merchant; an offer object 2205 owned by the manufacturer; and a customer service object 2206 owned by the merchant.

Smart receipts offer the merchant centralized record keeping and inventory management. Orders are kept in a standardized format. The merchant can also track if a user uses an offer in a Smart Receipt. The offers in a Smart Receipt can be personalized to a user's preferences which are kept secure on the Trusted Agent server. The personalized offers can be customized to follow certain specifications, such as:

Timeliness—limited-time offers

Matching offers to user preferences

Merchant specified offer conditions

User preferences include information directly obtained from the user (e.g., through a questionnaire) and may also include information gathered from observing the user's purchasing habits and preferences.

Smart receipts also offer the merchant the ability to receive return receipts when the user receives the Smart Receipt. The merchant and manufacturer can also receive valuable feedback information from the customer. The customer can fill in or select answers to questions contained in LEDOs. The questions can pertain to whether the customer received the product in a timely manner, is satisfied with the product, or merchant customer service.

The Smart Receipt can contain a warranty registration card that is automatically filled out when the Buyer indicates that he has received the product.

The dynamic nature of the Smart Receipt allows merchants lo notify Buyers of certain events. For example, airlines, hotels, and cruise lines can update the Smart Receipt to indicate a change of schedule, room or seating changes, delays, and cancellations. Car rental agencies can indicate rental options or availability by simply updating the Smart Receipt. The Buyer is automatically notified when he checks the Smart Receipt through the Trusted Agent.

The interaction with the buyer that is gained from Smart Receipts allows the merchant to provide good customer service; customers are more assured that they will receive prompt, reliable service. It simplifies user record keeping and gives the manufacturer another route to notify customers of product updates.

Post-Purchase Services

The Smart Receipt enables the merchant to provide post-purchase services to the customer by embedding additional information within the XML representation of the receipt. Each of these embedded components may be URLs or they may be LEDOs that represent:

- Offers (see Offers section)
- Warranties
- Extended Warranties (an offer than sells a warranty)
- Customer Service request—web form that contains frequent problems and assists in routing an email message to the correct department
- Merchant preferences Merchant Server Component The merchant server should support the top merchant servers including:

- MS Site Server Commerce Edition
- Netscape
- Open market
- Mercantec's SoftCart
- General CGI interface Preferences-and Offers 1. Offer Preferences A web-based form for creating, viewing and editing preferences is provided for the marketing department. The form for creating preferences has a scrollable list for parent categories and type, and empty fields for description and notes. Submitting a new preference will create a LEDO and commit it to the database. The program also generates pages of preferences organized by category and subcategory similar to the intended functionality of the PCM. However, the users will also need to be able to delete preferences from the database and edit the parent, description, notes, and type fields.

| OfferPreference Table | | |
|---|---|---|
| Uniquekey | varchar2(40) | unique ledo key |
| Ownerid | number | (tbd, perhaps indicator of marketing personnel) |
| Objectid | number | unique within table |
| create_date | date | |
| db_delete_date | date | |
| parent | number | index into OfferPreferenceTable of parent category, 0 for root |
| description | varchar2(250) | name of category, subcategory, or merchant |
| notes | varchar(2000) | notes for marketing person |
| type | varchar(20) | constrain to "category", "subcategory" or "merchant" |
| <potential columns to be added> | | |
| SIC number | number | standard industry code |
| categoryKey | number | index into categories table |

2. Offer Registry

The end-user will have the ability to set and unset offer preferences, according to the set of preferences in the OfferPreferenceTable. Setting or unsetting a preference will look up any existing match between the user and the preference. If a record is found, the create date and or delete date are modified as appropriate. This way, it is possible to track use of the offer registry more accurately.

| OfferRegistryTable | | |
|---|---|---|
| OwnerID | number | index into identity table |
| PreferenceID | number | index into OfferPreferenceTable |
| Create date | date | |
| Delete date | date | |
| <ownerID/preferenceID pair must be unique> | | |

3. Offers

Offers are stored as LEDOs in the database. A web-based system for submission and viewing of offers is supplied for merchants and marketing. Merchants are able to submit text and images for offers at any time for review. Marketing has the ability to view newly entered offers and sign off on their acceptability.

The Offer table contains the information for the individual offers, including availability dates and separate fields for the distinct text areas and images in the offer page. Since a single offer may match several preferences, there will be a secondary preferenceID field in the offer record. Alternatively, it could be organized such that multiple offer LEDOs represent the same offer, with different preferenceID's.

| Offers | | |
|---|---|---|
| Uniquekey | varchar2(40) | ledo unique key |
| OwnerID | number | (tbd, perhaps merchant index or marketing personnel index) |
| Preference | number | index into preference table |
| Title | varchar(50) | bold text title of offer |
| Header | varchar(50) | textual description above Offer_gif |
| Description | varchar(1000) | textual description of item |
| Footer | varchar(50) | bold footer after description |
| LocationURL | varchar(1000) | uri with affiliate link of offer on merchant site |
| Logo_GIF | varchar(250) | uri (local or external) of logo gif |
| Offer GIF | varchar(250) | uri (local or external) of central offer gif |
| Start date | date | first day offer is valid |
| End date | date | last day offer is valid |
| Create date | date | date entered into system |
| Signoffdate | date | date ok'd by marketing |
| Db_delete_date | date | date removed from system |

4. Delivered Offers

For each user, there will be a set of viewed offers. These records contain information about the progress of the user in relation to the offer.

| DeliveredOffers | | |
|---|---|---|
| Uniquekey | varchar2(40) | ledo unique key |
| OwnerLD | number | index into identity table |
| OfferID | number | index into offer table - constrained to be unique per ownerID |
| Viewed date | date | time index of last visit to offer page |
| Followed date | date | time index of last click of affiliate link |
| Execute date | date | time index of purchase of advertised item |

Trusted Intermediary

The invention acts as an trusted intermediary. This is particularly useful when multiple parties that do not necessarily trust each other to interact are involved in a transaction.

A further embodiment of the invention acts as an impartial fair witness in negotiation situations. Using the Smart Receipt constructs described above, the invention provides a detailed record of the chain of events that occur during a negotiation.

Figure 23:
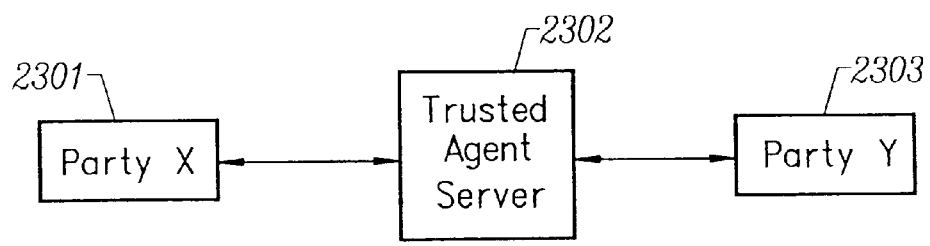
FIG. 23 is a block schematic diagram of a trusted agent server acting as a trusted intermediary between two parties according to the invention.

Referring to FIG. 23, a Trusted Agent Server 2302 sits between a client X 2301 and a client Y 2303. The Trusted Agent Server 2302 acts as the trusted intermediary between the two parties X 2301 and Y 2303.

Figure 24:
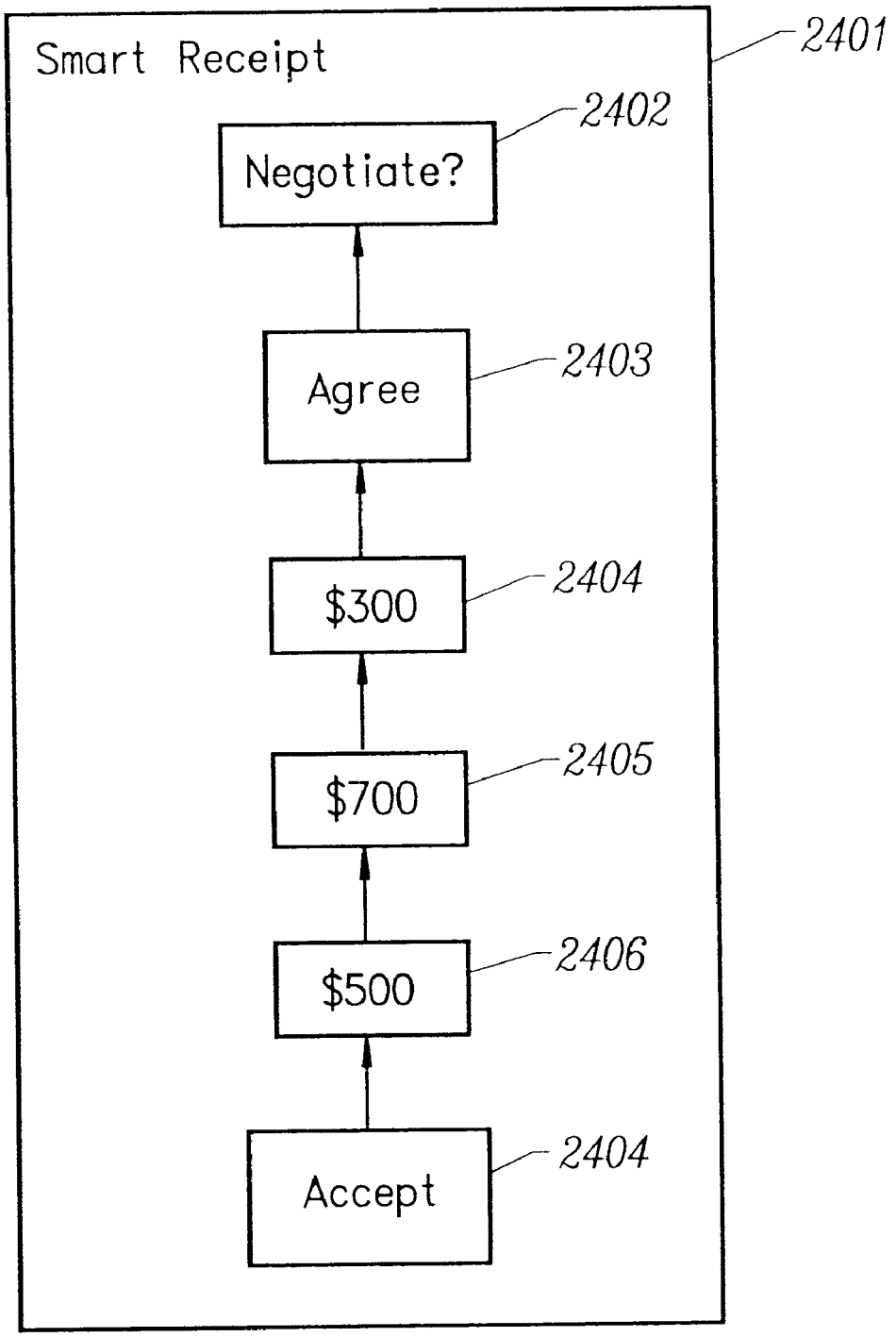
FIG. 24 is a block schematic diagram of an exemplary LEDO chain in a smart receipt containing negotiation events according to the invention.

With respect to FIG. 24, this scenario example has user X offering to enter negotiations with user Y. The order object in the Smart Receipt chain 2401 is X's offer to enter into negotiations 2402. Y then responds with a positive confirmation 2403. Each LEDO has a unique owner, here, X owns the offer LEDO 2402 and Y owns the acceptance LEDO 2403.

X then begins the negotiations by issuing an offer object 2404 which is a LEDO attached to the current Smart Receipt chain. Y issues a counter-offer object 2405. X then issues another offer object 2406. Y decides that the offer is acceptable and issues an acceptance object 2407.

As noted above, the Smart Receipt provides a detailed record of each step of the negotiations. Each step is a LEDO object in the Smart Receipt chain.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for creating and maintaining smart electronic receipts that document online transactions through a Trusted Agent Server in a computer environment, comprising the steps of:

creating a Smart Receipt on a merchant site upon successful completion of a transaction;

sending said Smart Receipt to a Trusted Agent Server;

storing said Smart Receipt on a secure database on said server;

wherein said Smart Receipt is comprised of a chain of Limited Edition Digital Objects (LEDOs); and wherein offers provided in a Smart Receipt can be personalized to a user's preferences.

2. The process of claim 1, further comprising the step of:

providing a Smart Receipt Agent on the merchant's server; and wherein said Smart Receipt Agent creates a representation of the purchase transaction in a Smart Receipt format.

3. The process of claim 1, wherein the user can sort and browse his Smart Receipts through a Trusted Agent.

4. The process of claim 1, wherein a Trusted Agent creates an order record.

5. The process of claim 4, further comprising the steps of:

storing said order record on a database on said Trusted Agent Server; and comparing order record LEDOs in said database with said Smart Receipt's LEDO to find the matching record pair.

6. The process of claim 1, wherein said Smart Receipt is a dynamic entity and is continuously updated until the Buyer deletes it from said Trusted Agent Server.

7. The process of claim 1, wherein each LEDO object has a unique owner.

8. The process of claim 1, wherein a merchant or manufacturer can track whether a user uses an offer provided in a Smart Receipt.

9. The process of claim 1, further comprising the step of:

sending a merchant a return receipt when the user receives the associated Smart Receipt.

10. The process of claim 1, wherein said Smart Receipt contains a warranty registration card that is automatically filled out when the Buyer indicates that he has received the product.

11. The process of claim 1, wherein a merchant or manufacturer updates said Smart Receipt to notify a customer of new events.

12. The process of claim 1, wherein a merchant provides post-purchase services to a customer by embedding additional information within said Smart Receipt.

13. A process for implementing an electronic trusted intermediary between parties involved in a negotiation in a computer environment, comprising the steps of:

providing a Trusted Agent Server to act as the impartial trusted intermediary between said parties;

recording each step that occurs during the negotiations as a Limited Edition Digital Object (LEDO) in a Smart Receipt;

storing said Smart Receipt on a secure database on said Server;

wherein said Smart Receipt is comprised of a chain of LEDOs; and wherein a Trusted Agent submits a party's offer, counter-offer, or acceptance LEDO to said Server.

14. The process of claim 13, wherein a party can browse said Smart Receipt through a Trusted Agent.

15. An apparatus for creating and maintaining smart electronic receipts that document online transactions through a Trusted Agent Server in a computer environment, comprising:

a module for creating a Smart Receipt on a merchant site upon successful completion of a transaction;

a module for sending said Smart Receipt to a Trusted Agent Server;

a module for storing said Smart Receipt on a secure database on said server;

wherein said Smart Receipt is comprised of a chain of Limited Edition Digital Objects (LEDOs); and wherein offers provided in a Smart Receipt can be personalized to a user's preferences.

16. The apparatus of claim 15, further comprising:

a Smart Receipt Agent on the merchant's server; and wherein said Smart Receipt Agent creates a representation of the purchase transaction in a Smart Receipt format.

17. The apparatus of claim 15, wherein the user can sort and browse his Smart Receipts through a Trusted Agent.

18. The apparatus of claim 15, wherein a Trusted Agent creates an order record.

19. The apparatus of claim 18, further comprising:

a module for storing said order record on a database on said Trusted Agent Server; and a module for comparing order record LEDOs in said database with said Smart Receipt's LEDO to find the matching record pair.

20. The apparatus of claim 15, wherein said Smart Receipt is a dynamic entity and is continuously updated until the Buyer deletes it from said Trusted Agent Server.

21. The apparatus of claim 15, wherein each LEDO object has a unique owner.

22. The apparatus of claim 15, wherein a merchant or manufacturer can track whether a user uses an offer provided in a Smart Receipt.

23. The apparatus of claim 15, further comprising:

a module for sending a merchant a return receipt when the user receives the associated Smart Receipt.

24. The apparatus of claim 15, wherein said Smart Receipt contains a warranty registration card that is automatically filled out when the Buyer indicates that he has received the product.

25. The apparatus of claim 15, wherein a merchant or manufacturer updates said Smart Receipt to notify a customer of new events.

26. The apparatus of claim 15, wherein a merchant provides post-purchase services to a customer by embedding additional information within said Smart Receipt.

27. An apparatus for implementing an electronic trusted intermediary between parties involved in a negotiation in a computer environment, comprising:

a Trusted Agent Server to act as the impartial trusted intermediary between said parties;

a module for recording each step that occurs during the negotiations as a Limited Edition Digital Object (LEDO) in a Smart Receipt;

a module for storing said Smart Receipt on a secure database on said Server;

wherein said Smart Receipt is comprised of a chain of LEDOs; and wherein a Trusted Agent submits a party's offer, counter-offer, or acceptance LEDO to said Server.

28. The apparatus of claim 27, wherein a party can browse said Smart Receipt through a Trusted Agent.

* * * * *